(12) United States Patent
Yoshida et al.

(10) Patent No.: US 7,672,382 B2
(45) Date of Patent: Mar. 2, 2010

(54) OFDM RECEIVING METHOD AND APPARATUS

(75) Inventors: Makoto Yoshida, Kawasaki (JP); Yoshinori Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 2146 days.

(21) Appl. No.: 10/118,710

(22) Filed: Apr. 9, 2002

(65) Prior Publication Data

US 2003/0053412 A1 Mar. 20, 2003

(30) Foreign Application Priority Data

Sep. 14, 2001 (JP) .............................. 2001-279292

(51) Int. Cl.
*H04L 27/28* (2006.01)

(52) U.S. Cl. .................. 375/260; 375/316; 370/208; 370/210; 455/10; 455/504; 455/506

(58) Field of Classification Search .......... 375/260, 375/316; 370/208, 210, 343; 343/876; 455/10, 455/504, 506
See application file for complete search history.

(56) References Cited

U.S. PATENT DOCUMENTS

| | | | | |
|---|---|---|---|---|
| 5,973,642 A * | 10/1999 | Li et al. | ...................... | 342/378 |
| 6,128,276 A | 10/2000 | Agee | | |
| 6,134,262 A * | 10/2000 | Kitade et al. | ................. | 375/142 |
| 6,226,507 B1 * | 5/2001 | Ramesh et al. | ........... | 455/277.1 |
| 6,295,326 B1 * | 9/2001 | Tonissen et al. | ............. | 375/350 |
| 6,397,067 B1 * | 5/2002 | Tanaka et al. | ................ | 455/446 |
| 6,441,786 B1 * | 8/2002 | Jasper et al. | ................. | 342/383 |
| 7,031,410 B1 * | 4/2006 | Schenk et al. | ................ | 375/346 |
| 2001/0005182 A1 * | 6/2001 | Aaltonen | ..................... | 343/882 |

FOREIGN PATENT DOCUMENTS

| | | |
|---|---|---|
| EP | 0 184 447 | 6/1986 |
| EP | 1 093 268 | 4/2001 |
| EP | 1 126 673 | 8/2001 |

OTHER PUBLICATIONS

European Search Report dated Oct. 22, 2004.
Shinsuke, Hara et al. Overview of Multicarrier CDMA. IEEE Communications Magazine, pp. 126-133 Dec. 1997.
Sadayuki, Abeta et al. Performance of Coherent Multi-Carrier/DS-CDMA and MC-CDMA for broadband Packet Wireless Access. IEICE Trans. Commun., pp. 406-414 Mar. 2001.

* cited by examiner

*Primary Examiner*—Mohammad H Ghayour
*Assistant Examiner*—Leila Malek
(74) *Attorney, Agent, or Firm*—Katten Muchin Rosenman LLP

(57) ABSTRACT

In order to improve upon a degradation in performances due to inter-carrier interference without loss of transmission efficiency, antennas provided on a mobile body are made directional antennas. An antenna selection unit selects a directional antenna in such a manner that Doppler shift that is caused by movement of the mobile body will keep a constant sign that is positive or negative, a fading-variation calculation unit calculates the average value of fading variation on each path of a multipath environment, and a fading-variation compensation unit compensates the multipath fading variation based upon the average value.

7 Claims, 21 Drawing Sheets

FIG. 4
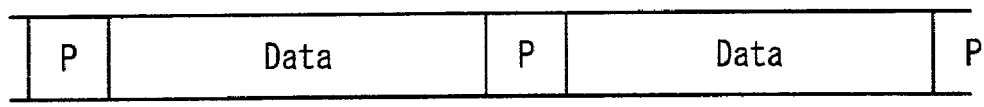
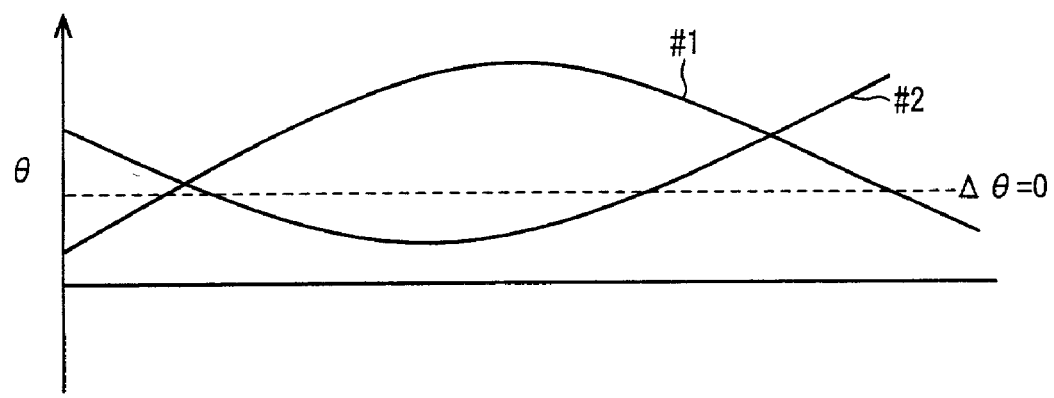
FIG. 5
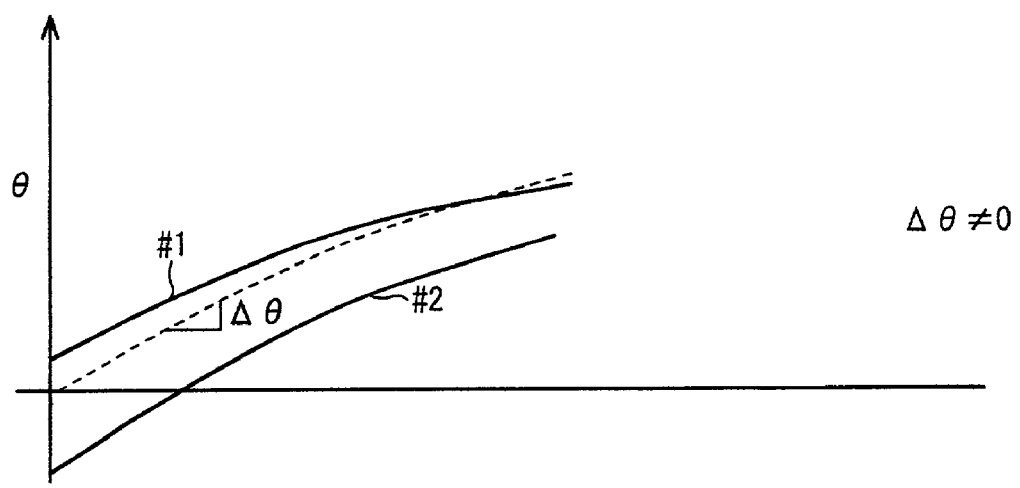

DIRECTION OF ARRIVING RADIO WAVES →

FIG. 15
(a) HIGE VELOCITY
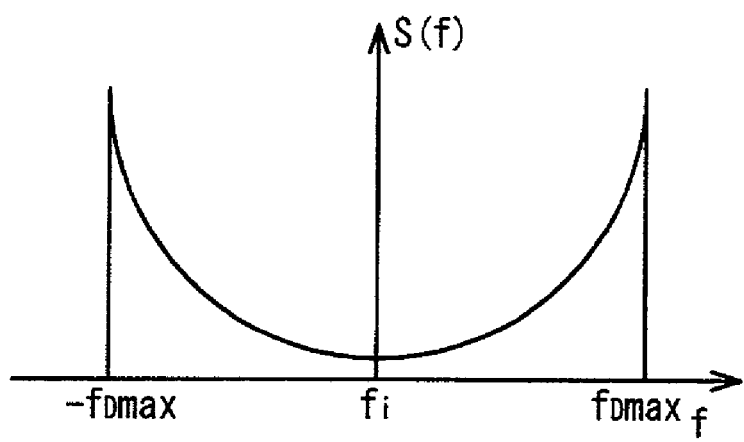
(b) LOW VELOCITY
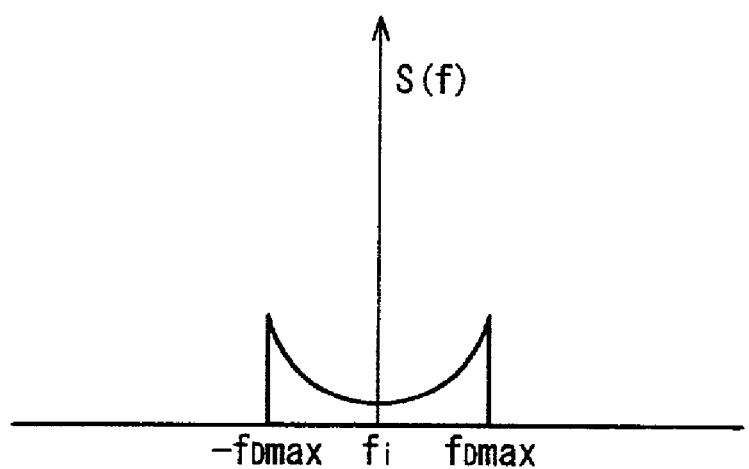

FIG. 22
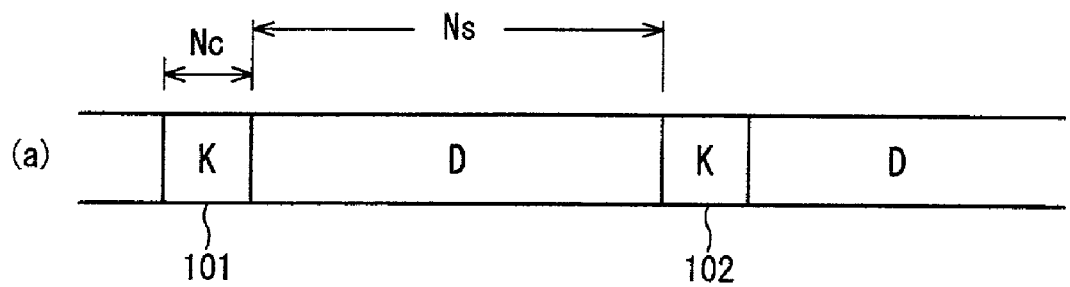
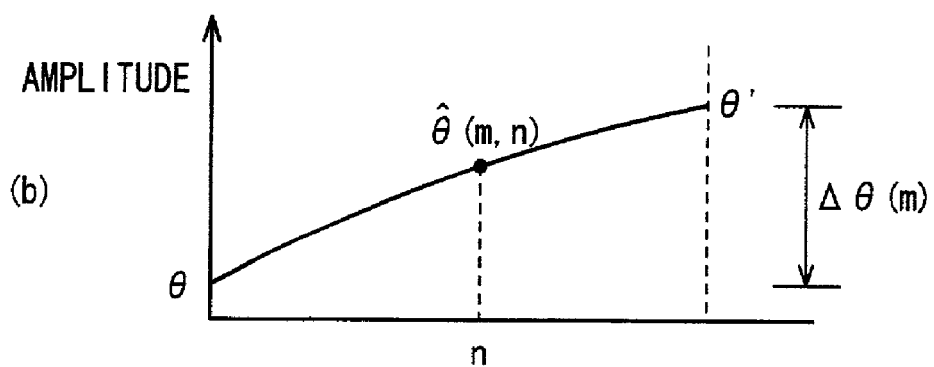
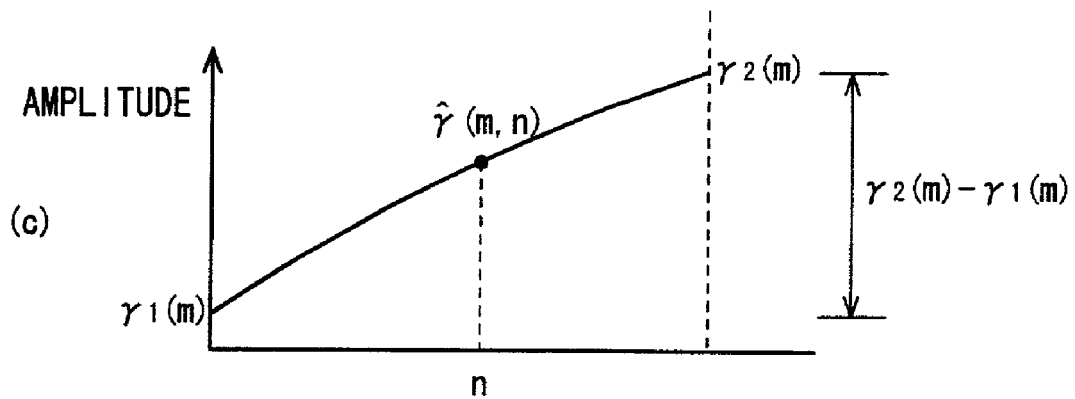

FIG. 24 PRIOR ART
(a) 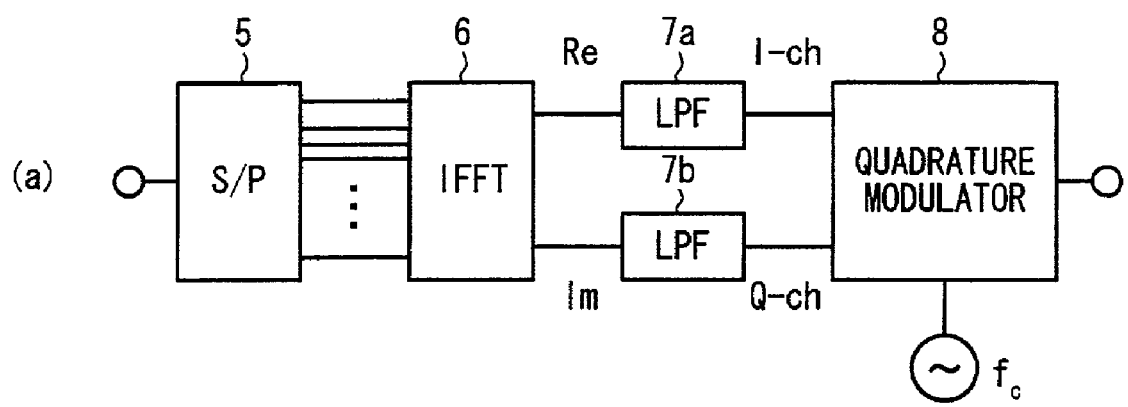
(b) 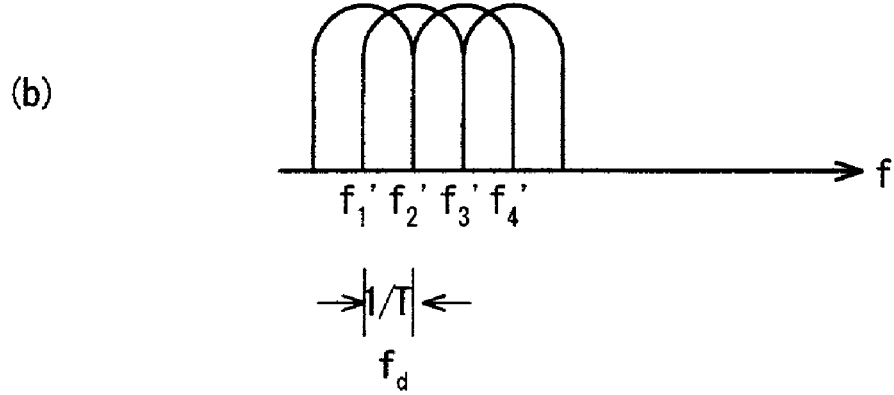

OFDM RECEIVING METHOD AND APPARATUS

BACKGROUND OF THE INVENTION

This invention relates to an OFDM receiving method and apparatus. More particularly, the invention relates to an OFDM receiving method and apparatus for receiving a signal multiplexed according to Orthogonal Frequency Division Multiplexing (OFDM) and applying FFT processing to the received signal to demodulate transmit data.

In wideband wireless communications, frequency-selective fading due to multipath causes a decline in channel quality. Multicarrier transmission is known as a method of modulation that is highly resistant to multipath fading. The method divides the transmission band into a plurality of (N) carriers (referred to as "subcarriers"), whereby a frequency diversity effect is obtained with respect to frequency-selective fading. This makes it possible to achieve high-quality wireless transmission. In FIG. 23, (a) is a diagram useful in describing a multicarrier transmission scheme. A serial/parallel converter 1 converts serial data to parallel data and inputs the parallel data to quadrature modulators 3a to 3d via low-pass filters 2a to 2d, respectively. In FIG. 23, the serial data is converted to parallel data comprising four symbols. Each symbol is a complex number and includes an in-phase component and a quadrature component. The quadrature modulators 3a to 3d subject each symbol to quadrature modulation by subcarriers having frequencies f1 to f4 illustrated in (b) of FIG. 23, a combiner 4 combines the quadrature-modulated signals and a transmitter (not shown) up-converts the combined signal to a high-frequency signal and then transmits the high-frequency signal. With the multicarrier transmission scheme, the frequencies are arranged, as shown in (b) of FIG. 23, in such a manner that the spectrums will not overlap in order to satisfy the orthogonality of the subcarriers.

Orthogonal Frequency Division Multiplexing (OFDM) is one mode of multicarrier transmission, in which frequency spacing is arranged so as to null the correlation between a modulation band signal transmitted by an nth subcarrier of multicarrier transmission and a modulation band signal transmitted by an (n+1)th subcarrier. In FIG. 24, (a) is a block diagram of an apparatus on the transmitting side based upon the OFDM scheme. The apparatus includes a serial/parallel converter 5 for converting serial data (in)to parallel data comprising a plurality of (e.g., N) symbols (I+jQ, which is a complex number). An IFFT (Inverse Fast Fourier Transform) arithmetic unit 6, which is for the purpose of transmitting the symbols as subcarriers having a frequency spacing shown in (b) of FIG. 24, applies an inverse fast Fourier transform to the frequency data to effect a conversion to a time signal in which subcarrier frequency components have been multiplexed, and inputs the real and imaginary parts to a quadrature modulator 8 through low-pass filters 7a, 7b. The quadrature modulator 8 subjects the input data to quadrature modulation, and a transmitter (not shown) up-converts the modulated signal to a high-frequency signal. On the receiving side, N symbols (OFDM symbols) that have been transmitted by N subcarriers are demodulated and output by an operation that is the reverse of the operation performed on the transmitting side (i.e., by a time-to-frequency conversion using FFT).

In accordance with OFDM, a frequency assignment of the kind shown in FIG. 24(b) becomes possible, thereby enabling an improvement in the spectrum efficiency. OFDM is different from other multicarrier transmission schemes that modulate their carriers independently, and since modulation/demodulation is performed at a stroke by an FFT, an orthogonal relationship is established among the carriers. Further, by adding on a guard interval signal on the transmitting side, it is possible to eliminate inter-symbol interference (ISI) caused by multipath delay. FIG. 25 is a diagram for describing the insertion of a guard interval (GI). If an IFFT output signal conforming to one OFDM symbol is adopted as one unit, insertion of the guard interval signifies copying the tail-end portion of the signal to the leading end thereof.

Thus, with OFDM, multipath equalization basically is unnecessary. However, in order to avoid causing a decline in performance, a guard interval that is larger than the maximum delay time of multipath envisioned in the system must be set in such a manner that ISI will not occur. Though inserting the guard interval (GI) makes it possible to eliminate the influence of ISI caused by multipath, a tradeoff is involved in that the guard interval diminishes transmission efficiency at the same time.

In order to mitigate the decline in transmission efficiency, it is necessary to make the OFDM symbol duration as large as possible, i.e., to make the guard ratio {[guard interval (Tg)]/[OFDM symbol duration (Tu)]} as small as possible. From this viewpoint, the carrier spacing ($\Delta$f) in the given bandwidth should be made small, i.e., the number of carriers should be increased.

However, due to fading, the receive signal varies not only along the time direction but also along the frequency direction. (This variation is a Doppler shift). Doppler shift proportional to moving velocity (v) is produced in the range of maximum Doppler frequency. If the carrier spacing is small, this variation is greater than one carrier and carrier synchronization on the receiving side is difficult. Furthermore, due to multipath, each path follows uncorrelated fading. As a consequence, frequency-selective fading, in which the variation sustained differs depending upon the frequency, occurs and the performance at the receiver is degraded. The reason for this is that inter-carrier interference (ICI) occurs because frequency fluctuation is independent from carrier to carrier (or, more specifically, from carrier group to carrier group within the coherence bandwidth). In order to suppress the degradation of performance caused by ICI, it is necessary to make the carrier spacing as large as possible. Thus there is a tradeoff with regard to transmission efficiency.

Thus, a technique for suppressing ICI is essential in order to raise transmission efficiency and avoid causing the degradation of performance in given system parameters. In order to suppress ICI in a multipath environment, each path must be estimated strictly and the fluctuation components thereof must be equalized. There are two techniques conceivable for achieving this, namely (1) FFT preprocessing on the receiving side, and (2) FFT post-processing on the receiving side.

In (1) involving preprocessing, the constantly changing multipath environment must be estimated accurately, estimation units for the maximum number of paths envisioned must be provided in the receiver, and equalization thereof is necessary. Consequently, problems remain in terms of practicality. Furthermore, performances are degraded in a multipath environment in which the envisioned maximum number of paths is exceeded.

In (2) involving post-processing, the arrangement is such that equalization is performed on a per-carrier basis because processing is executed after the FFT. Accordingly, equalization processing must be executed with respect to all carriers into which the signal component of the local carrier to be estimated has leaked, and ideally it is required that the OFDM receiver that executes the FFT processing have (N−1)-number of taps. In order to implement this for all carriers, N×(N−1) calculations would be required.

Accordingly, on the assumption that the major part of the interference energy is made up of the neighboring carriers, the complexity can be suppressed by a whole-number multiple if equalization is performed taking M (<<N)-number of neighboring carriers as the object of equalization. However, since performance degradation occurs and the degree of this decline depends upon the reception environment, no assurance can be given to a communication channel that has undergone imperfect equalization processing.

SUMMARY OF THE INVENTION

Accordingly, an object of the present invention is to improve upon performance degradation due to ICI without loss of transmission efficiency.

According to the present invention, antennas provided on a mobile body are made directional antennas, and a directional antenna is selected in such a manner that Doppler shift that is caused by moving of the mobile body will keep constant on its sign (positive or negative). As a result, an average value of fading variation on each path in a multipath environment, which average value is calculated prior to an FFT operation, will correctly represent multipath fading variation. Such multipath fading variation is then compensated based upon the average value. In accordance with the basic invention, the multipath environment (number of paths and delay profile) per se is not estimated. As a result, ICI can be suppressed by a simple arrangement and the reception performance can be improved.

In the basic invention described above, means for adding on a weighting coefficient is provided between means for correcting multipath fading and a receive FFT calculation unit. By providing the attenuation means, effects equivalent to those of the above-mentioned basic invention can be obtained even if use is made of antennas not having ideal directivity (antenna gain).

In the basic invention mentioned above, a directional antenna gives minimum Doppler spread is selected in a case where a plurality of directional antennas that generate reception power greater than a threshold power exist. If this arrangement is adopted, an error floor due to ICI can be reduced and it is possible to achieve an improvement in performances not obtainable by an improvement in power efficiency that is the inherently merit of a directional antenna.

The basic invention is further provided with means for detecting moving velocity. When moving velocity is lower than the threshold velocity, the receive signals of sector antennas (directional antennas) are combined. When moving velocity is greater than the threshold velocity, on the other hand, compensation of multipath fading is carried out using a receive signal solely of a sector antenna (directional antenna) selected taking reception power and Doppler spread into consideration. If this arrangement is adopted, power efficiency can be improved at low-velocity moving in an environment in which radio waves arrive uniformly. Further, in a system having a changeover switch for selecting antennas, antenna switching can be avoided at of low-velocity moving and, hence, performance degradation can be eliminated.

If a mobile body is provided with n-number of (360°/n) directional antennas, e.g., with two 180°-directional antennas, one directed toward the front and one directed toward the rear, in an environment in which radio waves arrive from all directions over an azimuth of 360°, a two-branch diversity arrangement is constructed using the forward and rearward antennas as antennas of independent branches. If this arrangement is adopted, antenna switching can be eliminated and diversity reception that is free of any degradation in performances can be achieved.

In order to calculate an average value of fading variation (phase variation and amplitude variation) on each path in the basic arrangement, a cross-correlation vector is calculated using an already known temporally dispersed signal or a copy signal in a guard interval, and the amplitude and phase of the cross-correlation vector are obtained as an average value of fading variation (phase variation and amplitude variation) over all paths. Multipath fading is then compensated using the average value. If this expedient is adopted, channel compensation can be achieved and performances can be improved through a simple arrangement in a multipath fading environment.

Other features and advantages of the present invention will be apparent from the following description taken in conjunction with the accompanying drawings.

BRIEF DESCRIPTION OF THE DRAWINGS

FIG. 4 is a diagram useful in describing multipath phase variation in a case where an omnidirectional antenna is used;

FIG. 5 is a diagram useful in describing multipath phase variation in a case where a directional antenna is used;

FIG. 15 illustrates the relationship between moving velocity and Doppler spread;

FIG. 22 is a diagram useful in describing the operation of the calculation unit for calculating average amount of shift in variation;

FIG. 24 is a diagram useful in describing an OFDM scheme; and

DESCRIPTION OF THE PREFERRED EMBODIMENTS

(A) Principle of the Invention

Figure 1:
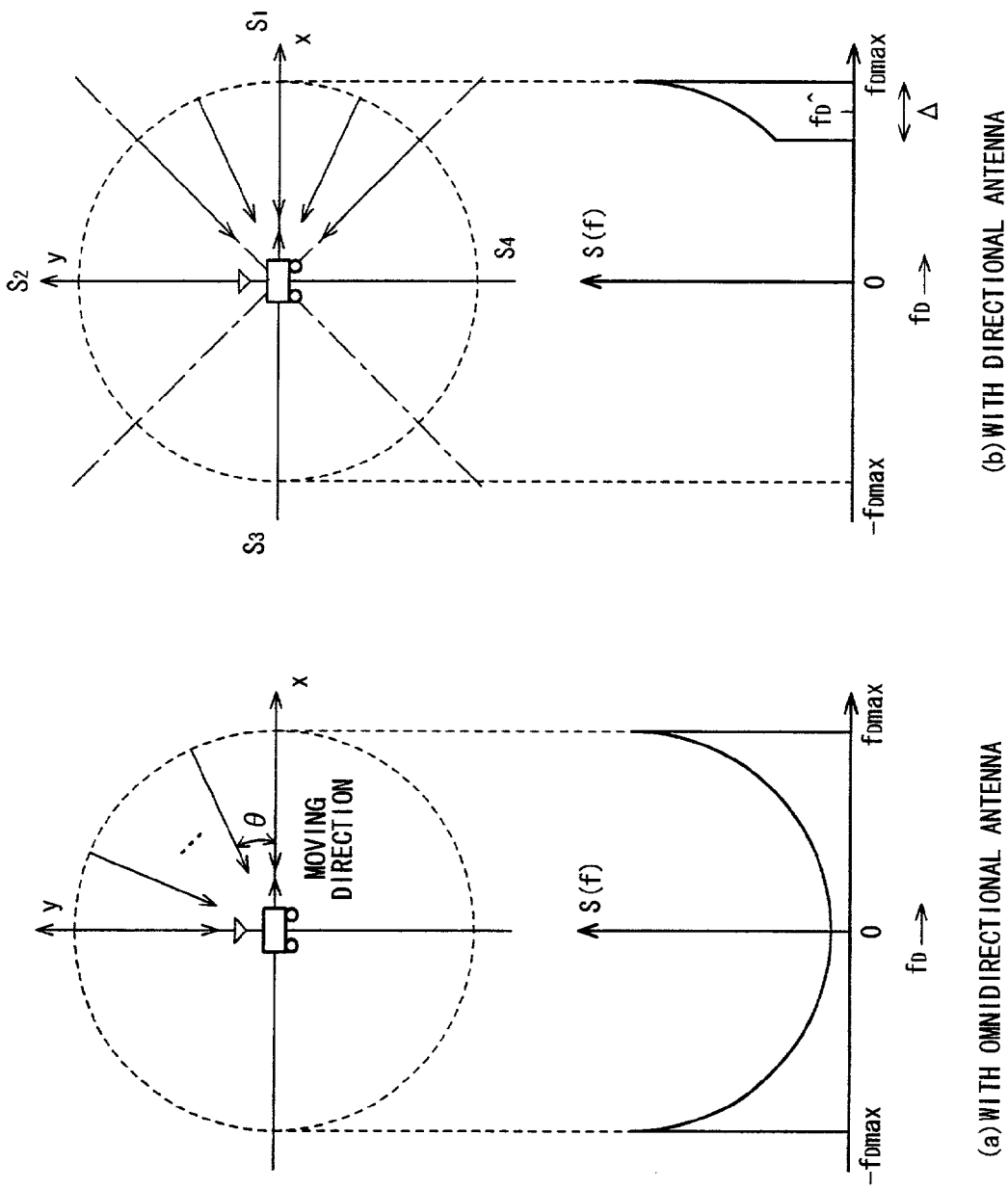
FIG. 1 shows Doppler spectra with and without directivity.

It is well known that the frequency characteristic of fading, namely a Doppler spectrum [S(f)], is represented by the Jakes scattering ring model, as shown in (a) of FIG. 1. Here the assumption is that an average value is received as equal power from all directions. Since the initial phase of each wave element differs, fading frequency ($f_D$) varies randomly within a frequency range ($-f_{Dmax}$ to $f_{Dmax}$) defined by Doppler spread.

In a case where an omnidirectional antenna having non-directivity is used, the signal undergoes variation, which exhibits Doppler spread of the kind shown in (a) of FIG. 1, on each path. As a result, frequency fluctuation between carriers is the maximum $2f_{Dmax}$. An evaluation of ICI is represented using normalization Doppler frequency $2f_{Dmax}/\Delta f$ as a parameter, taking this worst case into consideration. This scattering ring is based on the assumption that arriving waves (element waves) having a time difference smaller than the time resolution of the receiver (i.e., arriving waves for which there is no difference in path between the paths of arrival) are received by a mobile body over an azimuth of 360° and are combined to provide the resultant wave. When the point of reception moves in such case, a Doppler shift corresponding to the arrival direction (θ) of the element wave occurs. (This is a dynamic fading model.)

If a directional antenna, e.g., a 90° directional antenna, is used, the signal undergoes variation, which exhibits Doppler spread Δ of the kind shown in (b) of FIG. 1, on each path within the range of directivity. FIG. 1(b) is a model that exhibits suppression of Doppler spread (Δ) due to directivity and average Doppler frequency ($\hat{f_D}$) of element waves that arrive within the range of directivity. There is absolutely no limitation imposed by an adaptive antenna, which controls directivity adaptively, or by a sector antenna, which is used permanently sector by sector. At this time the Doppler variation is ($\hat{f_D}+\Delta$). As long as the range Δ of directivity does not straddle plus and minus, the Doppler shift is limited to a constant sign (the positive sign in FIG. 1). However, if the range of directivity has left-right symmetry at x=0, then $\hat{f_D}=0$ will hold and the Doppler shift will be Δ only. In the case of an omniantenna, $\hat{f_D}=0$ and $\Delta \equiv 2f_{Dmax}$ holds.

The above-described model merely illustrates a statistical property. In actuality, a signal undergoes fading variation $f_D(t)$ as a combined signal of element waves having random initial phases. Although initial phase is random, however, temporal variation of the combined waves is uniquely decided if a certain initial phase is decided. Furthermore, this is observed as Doppler shift in a fixed direction within a time period (T) in which temporal variation can be followed up, and $f_D(t)\equiv$const ($0\leq t\leq T$) is obtained. The amplitude/phase components of the receive signal are distorted due to fading variation at this time. However, in the case of a single path (flat fading), the variation component is a single component and, hence, frequency selectivity does not occur. In other words, variation within the bandwidth is fixed (flat), and it is possible for this to be ascertained as the amplitude and phase shift (variation in a fixed direction) of a fixed value if viewed momentarily, if fluctuation occurs within one receive symbol.

Accordingly, fading-variation compensation means can compensate for fading variation using an estimated amount of shift in a single-path environment having only a variation component in a fixed direction, thereby making it possible to obtain an improvement in performances regardless of the directivity of the antenna.

However, a multipath environment is different from a single-path environment. Multipath in a certain wireless environment means that there is more than one delayed wave recognized by the temporal resolution of the receiver. In other words, there are a plurality of the above-mentioned single paths and signals arrive on these paths at different times. Such circumstances arise when the temporal resolution of the system is high, namely at wideband wireless communications in which multipath is capable of being measured. Accordingly, when n paths exist in a multipath environment, n-number of independent Doppler shifts $\{f_D(t)^{[0]}, f_D(t)^{[1]}, \ldots, f_D(t)^{[n-1]}\}$ are superimposed on one another. However, by receiving these signals using the same antenna, the average Doppler frequency $\hat{f_D}$ and Doppler dispersion Δ, which are statistical parameters, take on the same values, which are independent of n, regardless of whether or not the antenna has directivity.

Following up a frequency variation that is a combination of fading variations on respective paths means following up an average fading variation $f_D(n)=\Sigma f_D(t)^{[i]}/n$ (i=0 to n−1) within the time of observation. However, the fading variation on each path is incorrelated. Therefore, if a certain number of paths exist, fluctuation components in the positive direction ($f_D \geq 0$) and negative direction ($f_D<0$) mix together within the observation time period, even if only phase components are taken into consideration, and $f_D(n) \to 0$ will hold according to the central limit theorem. Hence phase compensation control cannot be carried out based upon the average of fading variation. In the case of an omnidirectional antenna, therefore, the above-mentioned correction means cannot be realized.

Figure 2:
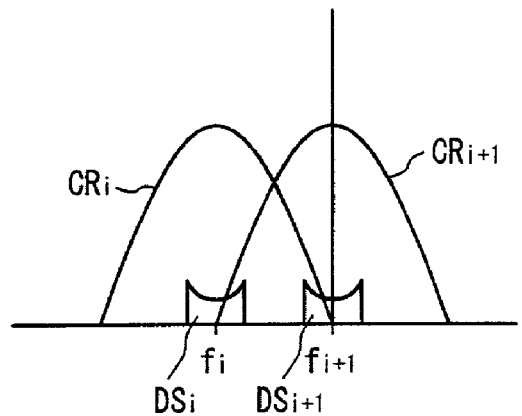
FIG. 2 is a diagram useful in describing the effects of Doppler shift in a case where an omnidirectional antenna is used.

To describe this in simple terms, consider that a mobile body is operating in an environment in which it typically receives radio waves over an azimuth of 360°. When a non-directional omnidirectional antenna is used as the antenna, therefore, Doppler spectrums $DS_i, DS_{i+1}, \ldots$, described in (a) of FIG. 1 are superimposed on OFDM carriers $CR_i$, $CR_{i+1}, \ldots$ of frequencies $f_i, f_{i+1}, \ldots$, as shown in FIG. 2. The higher the velocity of the mobile body, the larger the spread of the Doppler spectrums. In the case of a single path, each of the carriers varies in the same way in the frequency direction due to the Doppler shift, as a result of which no interference occurs between subcarriers. In the case of multipath, however, the fact that the initial phases of the paths differ means that the carriers vary individually in the frequency direction due to the Doppler shift, as a result of which interference occurs and orthogonality is lost.

Figure 3:
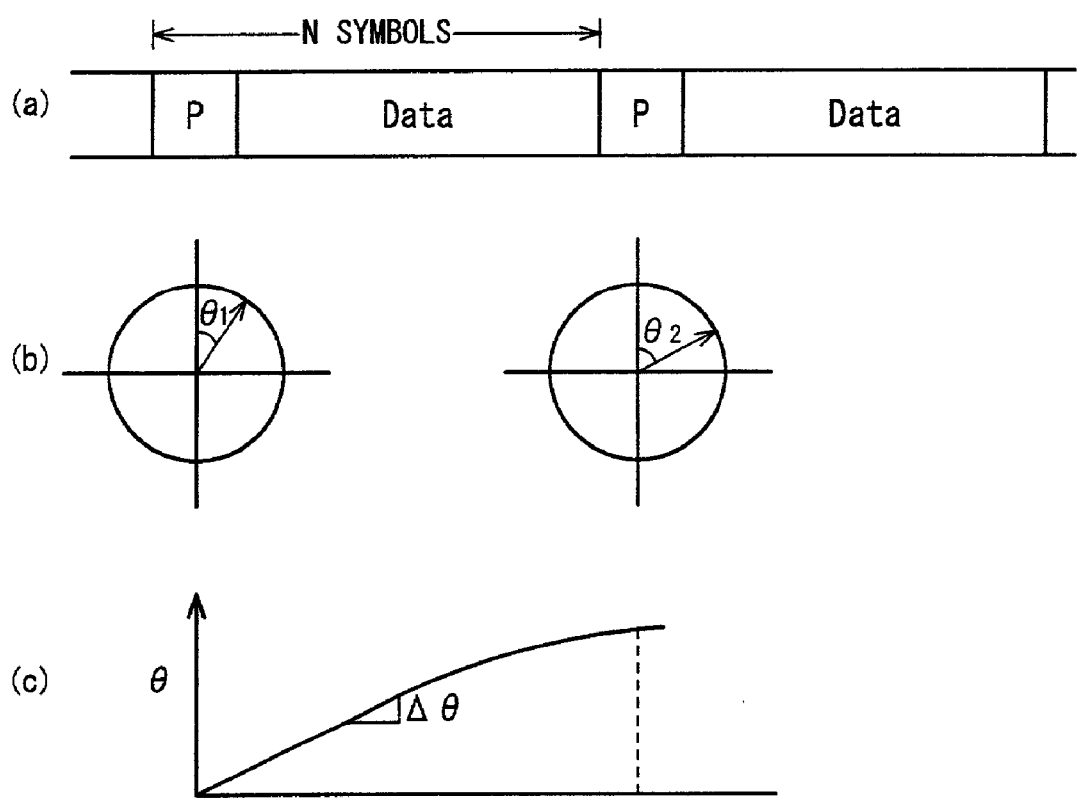
FIG. 3 is a diagram useful in describing fading compensation.

In order to compensate for such fading, detecting phase variation and nulling the phase errors. To detect phase variation, a known symbol, e.g., a pilot signal P, is inserted between data symbol 'Data', as illustrated in (a) of FIG. 3. If a symbol (the pilot symbol) has thus been inserted, correlation between the known symbol and a receive symbol can be calculated and the timing at which the correlation value peaks can be detected, thereby making it possible to detect the phase of the receive pilot. Accordingly, if the phases of two pilots bracketing a certain data symbol are $\theta_1, \theta_2$, as shown in (b) and (c) of FIG. 3, the phase shift Δθ per symbol becomes as follows:

$$\Delta\theta = (\theta_2 - \theta_1)/N$$

(where N represents the number of symbols of one OFDM symbol), and phase error due to fading, can be eliminated by performing compensation control symbol by symbol in such a manner that $\Delta\theta$ becomes zero.

However, the foregoing holds in the case of a single path. In the case of multipath, $\Delta\theta$ always becomes zero and a fading compensation by this method cannot be carried out. In other words, in the case of multipath, the initial phases of the paths differ and the phase variations on the paths become as indicated at #1, #2 in FIG. 4. Though only two paths are illustrated in FIG. 4, the phases of a number of paths cancel one another out when the phase variations of these paths overlap, and the average fading variation (the average phase variation) becomes a substantially constant value, as indicated by the dashed line in FIG. 4, and $\Delta\theta=0$ holds. Multipath fading cannot be compensated using such average fading variation.

Figure 6:
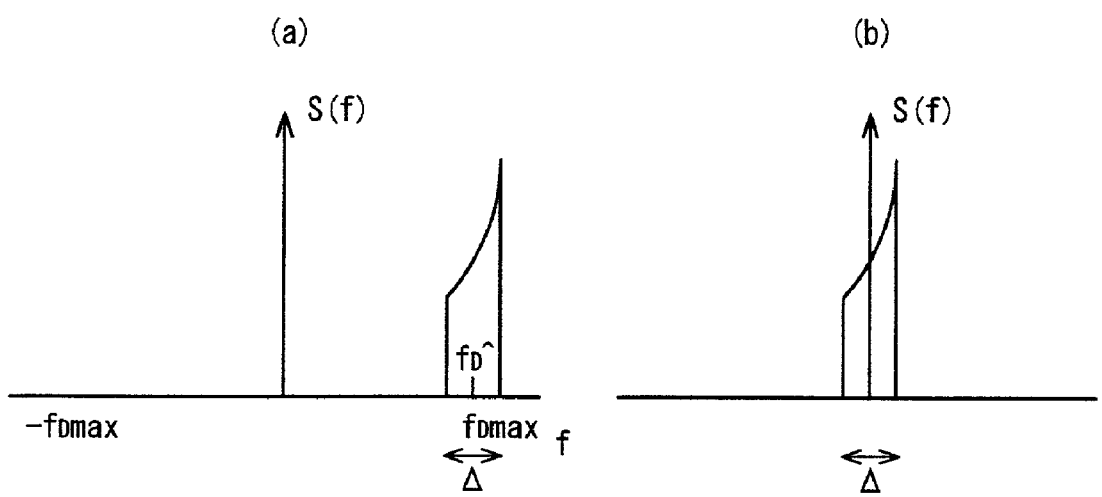
FIG. 6 is a diagram useful in describing the effects of fading compensation.

If a directional antenna is used instead of an omnidirectional antenna, it becomes possible not only to suppress the Doppler spread $\Delta$ but also to limit the range of the Doppler shift value to the positive or negative side. For example, consider a front antenna having a directivity of 90 or 180°. As evident from (b) of FIG. 1, the range of the Doppler shift is $f_{Dmax} \geq f_D(t)^{[i]} \geq f_D\hat{}-\Delta/2$ in the case of a 90° directional antenna and $f_{Dmax} \geq f_D(t)^{[i]} \geq 0$ (for any i) in the case of a 90° directional antenna. In other words, the range of the Doppler shift is in the positive sign for all paths within the range of directivity. Thus, if a directional antenna is used, the Doppler shift $f_D(t)^{[i]}$ ($0 \leq i < n$) of each path can be limited to a constant sign and therefore the amount of phase shift of each path will be in the same direction on all paths, as shown in FIG. 5. As a result, average fading variation (average amount of phase shift) changes as indicated for example by the dashed line, an amount $\Delta\theta$ of phase shift per symbol is produced and it is possible to compensate for multipath fading using $\Delta\theta$. Further, in addition to the Doppler-spread suppression effect of using a directional antenna, it is possible to achieve an effect in which the average Doppler frequency can be shifted from the state of (a) in FIG. 6 to that shown in (b) of FIG. 6, and interference ICI with respect to neighboring carriers can be suppressed. Though the foregoing is for the case of a forward-directed antenna having a directivity of 90 or 180°, similar effects are obtained also with a rearward-directed antenna having a directivity of 90 or 180°.

In other words, if a directional antenna is used, variation components in the direction opposite that of the antenna gain are eliminated. Phase variations in the same direction therefore occur in all carriers and the amounts of phase shift of respective ones of the paths can be considered momentarily to be fixed values. At this time the average fading variation (average amount of shift) $f_D(n)$ of multipath fading that is the result of combining these paths is the sum of the variation values on the respective paths. Naturally, therefore, the variation has a slope overall and has a fixed value momentarily. As a result, even in a multipath environment, a fading compensation using the average amount of phase shift becomes possible and an improvement in performances is achieved. However, this is as if the average value is followed up but not fading fluctuation on each individual path. Though this does not give optical, therefore, it can be said conversely that this is a robust scheme that is not sensitive about the state of the channel (e.g., the number of multiple paths, the delay profile, etc.). Further, since a compensation is applied for average amount of shift in fading variation at one stroke in front of the FFT calculation unit on the receiving side, simple means for suppressing ICI can be provided.

It should be noted that in a case where use is made solely of directional antennas, only the Doppler-spread suppression effect is obtained and there is little contribution to ICI suppression unless a limitation in a fixed direction is made. In particular, if directivity is taken perfectly horizontally (transversely) in the above-described example, a slope similar to that of an omnidirectional antenna will occur with respect to both suppression of Doppler spread and suppression of ICI, and hence the effect of using a directional antenna will be diluted.

(B) First Embodiment

Figure 7:
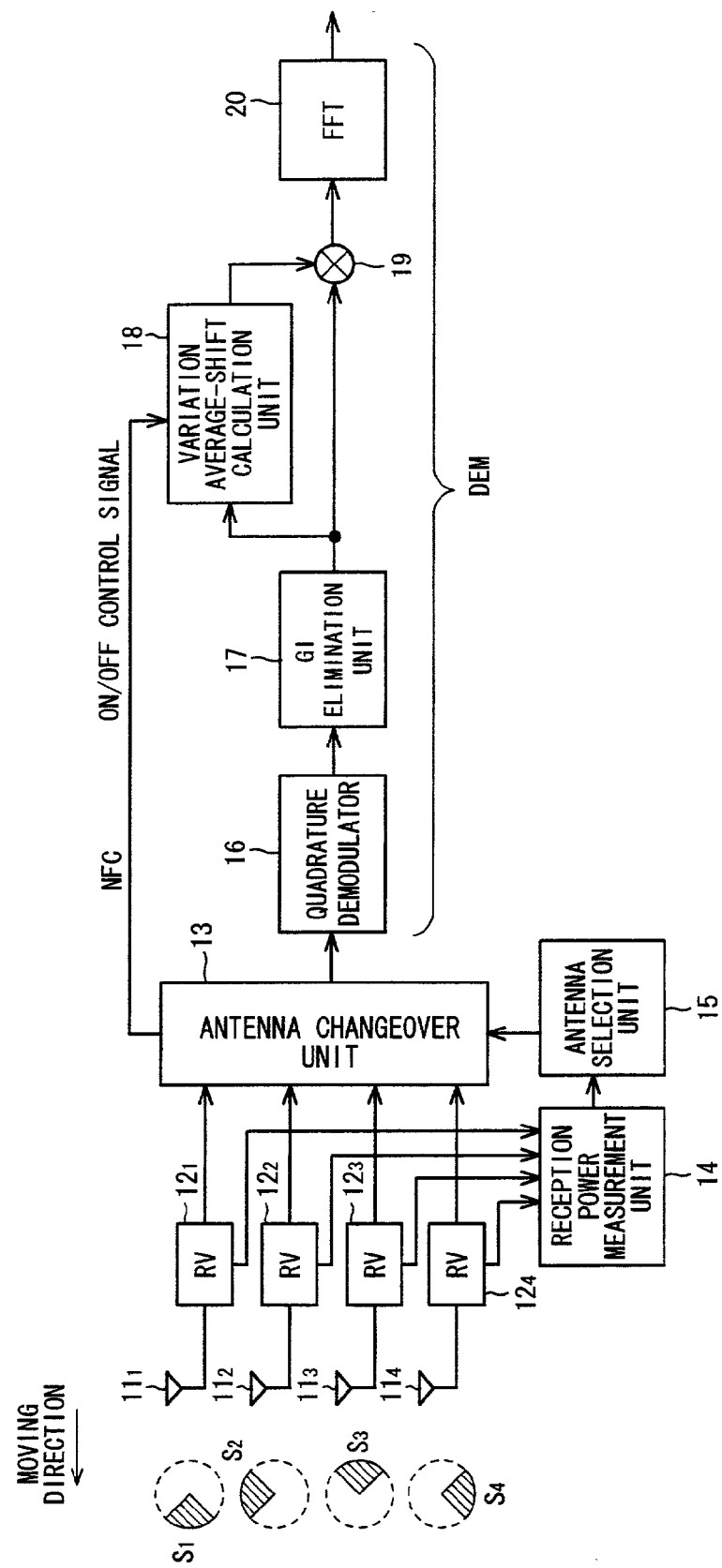
FIG. 7 is a block diagram of an OFDM receiving apparatus according to a first embodiment of the present invention.

FIG. 7 is a block diagram of an OFDM receiving apparatus according to the present invention. An angle of 360° centered on an automotive vehicle serving as a mobile body is divided into four sectors of 90° each indicated by $S_1$ to $S_4$ in (b) of FIG. 1, and the sectors $S_1$ to $S_4$ are provided with directional antennas $11_1$ to $11_4$, respectively. Sector $S_1$ points forward in the direction of vehicular movement, sector $S_4$ points rearward away from the direction of moving, and the remaining sectors $S_2$, $S_3$ point right and left, respectively, with respect to the direction of moving. Radio receivers $12_1$ to $12_4$ amplify received radio signals from respective ones of the antennas, effect a frequency down-conversion to baseband signals and input these signals to an antenna changeover unit 13. A reception power measurement unit 14 measures reception power by measuring the reception signal strengths, e.g., the RSSI (Received Signal Strength Indicators), of the radio receivers $12_1$ to $12_4$, and an antenna selection unit 15 selects the antenna of maximum reception power based upon the reception power measured, and inputs a signal indicative of the selected signal to the antenna changeover unit 13. The latter actually selects the antenna of maximum reception power and inputs the receive signal of this antenna to a quadrature demodulator 16, which constructs a demodulator DEM. The quadrature demodulator 16 subjects the receive signal to quadrature demodulation processing, and a guard-interval elimination unit 17 eliminates the guard interval GI from the receive signal after receive-signal synchronization is achieved. The resulting receive signal is then output.

A calculation unit 18 calculates the average amount of shift $\Delta\theta$ in variation per symbol of multipath fading by calculating the correlation between a known pilot signal and the receive signal, and a fading compensation unit 19 multiplies the receive signal by $\exp(-j\Delta\theta)$ to compensate for multipath fading. The resulting signal is input to an FFT calculation unit 20. The latter converts the signal in the time domain to N-number of carrier signals, and an error detector/error decoder (not shown) subjects the input data to processing for error detection, correction and decoding and outputs the decoded data.

In a case where the antennas $11_2$, $11_4$ having directivity to the right and level of the direction of moving have been selected so that the range of directivity bridges the positive and negative directions, or in a case where compensation of the average amount of shift of variation is inhibited for some reason, the antenna changeover unit 13 uses an ON/OFF control signal NFC to halt the multipath-fading compensation operation based upon the average amount of shift in variation. In order to halt the multipath-fading compensation operation, means are provided for halting the functional units concerned or for forcibly setting the amount of variation to zero.

Figure 25:
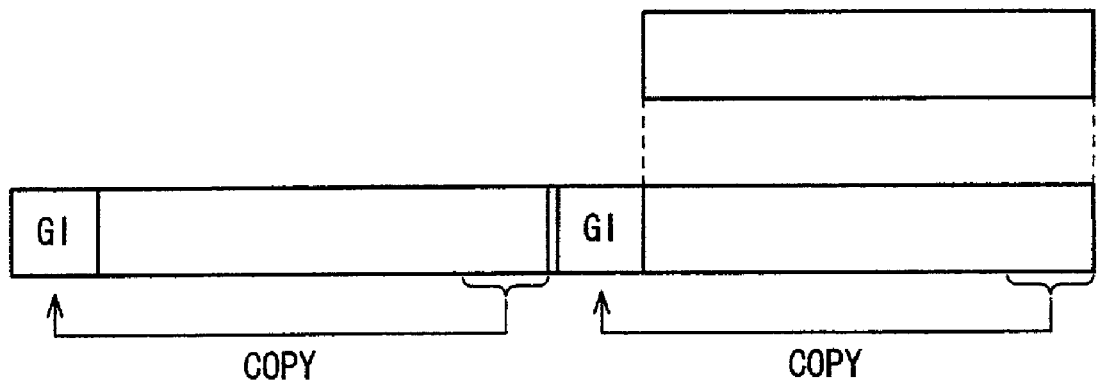
FIG. 25 is a diagram useful in describing a guard interval.

The calculation unit 18 in the first embodiment shown in FIG. 7 calculates the average amount of shift in phase variation by calculating the correlation between a known pilot signal and the receive signal. However, the calculation unit 18 can calculate the average amount of shift in phase variation using the guard interval GI. More specifically, as described above with reference to FIG. 25, the guard interval GI is created by copying the tail end of the one OFDM symbol to the leading end thereof. Accordingly, phase variation can be calculated if the correlation between the receive signal of the immediately preceding frame and the present receive signal is calculated. It should be noted that one frame is assumed to be (OFDM symbol+the symbol of the guard interval GI).

Though an arrangement having an antenna changeover unit is illustrated, the antenna changeover unit can be eliminated by providing the components 16 to 19 for each of the antennas.

Figure 8:
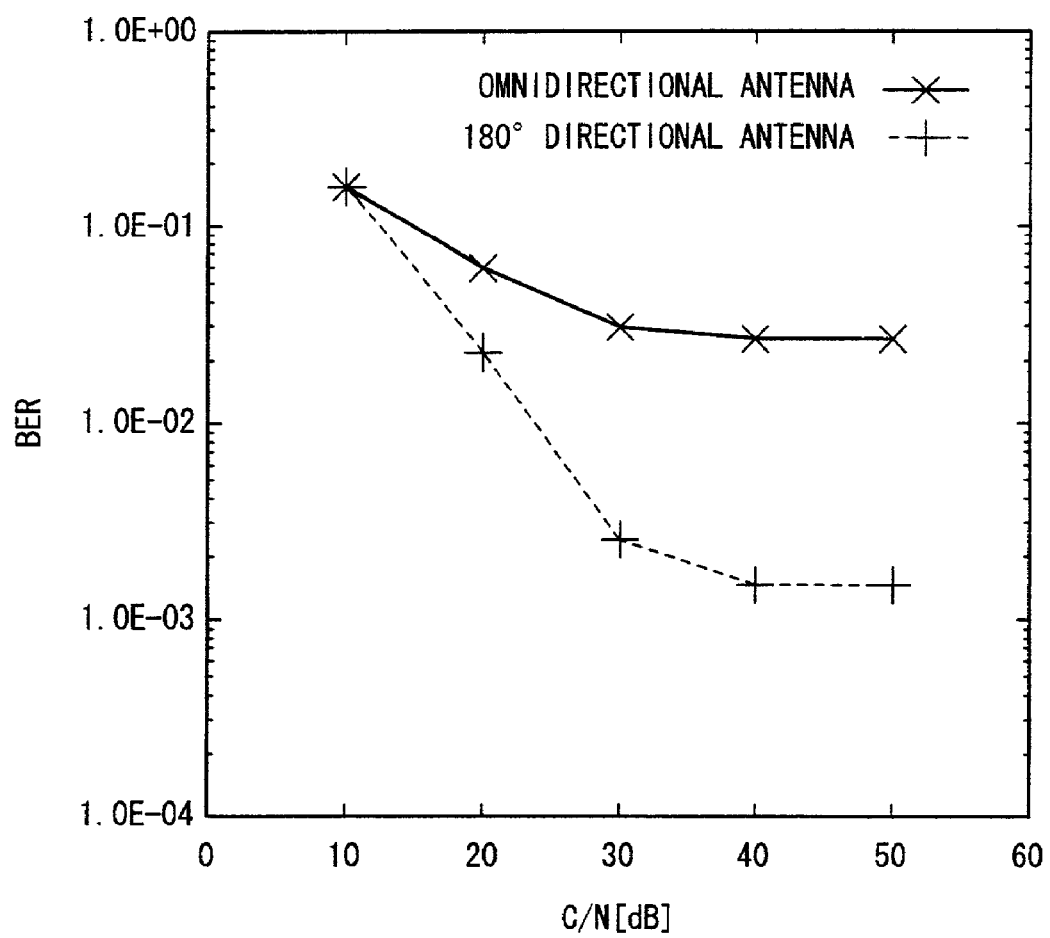
FIG. 8 illustrates a C/N vs. BER performance.
Figure 9:
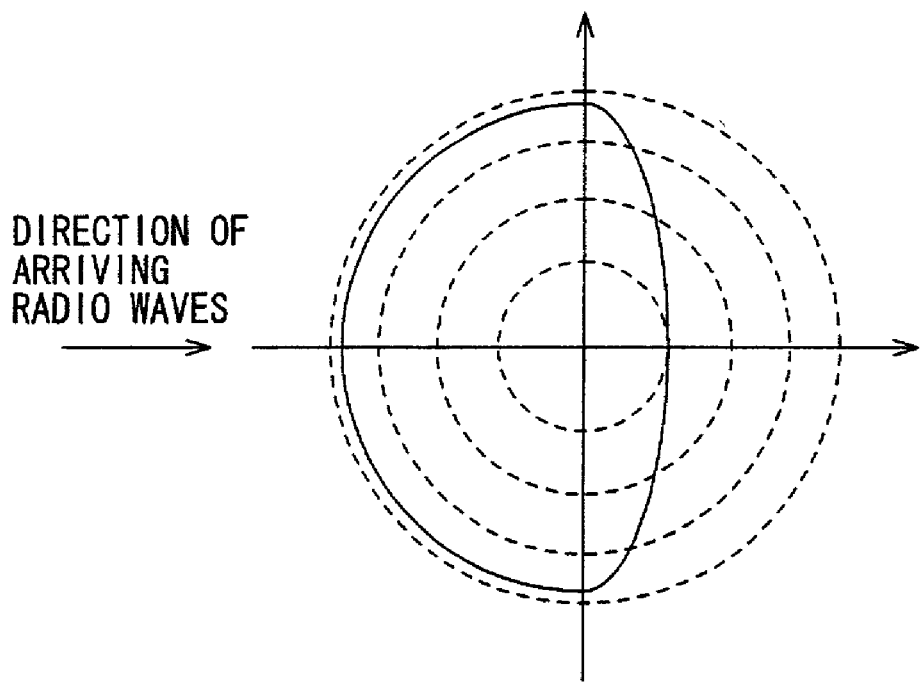
FIG. 9 is a diagram showing an example of the antenna gain pattern of a directional antenna.

FIG. 8 illustrates a C/N vs. BER performance for describing the effects of the first embodiment. This is for a case where use is made of ideal antennas (forward and rearward) having a directivity of 180°. Further, this performance was acquired by an arrangement having two-branch diversity, in which $f_{Dmax}Ts=0.071$ holds and the modulation scheme is that of 64 QAM, urban propagation model (6-wave Rayleigh fading, with all delayed waves falling within the guard time). The results of measurement (described later) were acquired under all of these conditions. Here $f_{Dmax}Ts$ is the normalized maximum Doppler frequency. Further, for the sake of comparison, a performance which prevails when an omnidirectional antenna is used is illustrated in FIG. 8. In accordance with the first embodiment, as evident from FIG. 8, the bit error rate BER can be improved by nearly factor of two at a certain C/N. directional antennas have an ideal antenna gain. The ideal gain signifies that element waves directed over the range of directivity can be received with a gain of 100% and, at the same time, that element waves from directions other than these (especially from the opposite direction) are shut out with a gain of 0%. In an actual antenna, however, perfect directivity cannot be produced owing to such factors as the installation conditions and used frequency characteristics, etc. FIG. 9 is a diagram showing an example of the antenna gain pattern of a directional antenna. Here the gain of element waves from the direction opposite the direction of arrival is not zero. Ideally, whereas the F/B ratio (front-to-back ratio) is ∞ [dB] with respect to the direction of directivity, in FIG. 9 the value obtained is only on the order of 5 to 6 [dB].

Figure 10:
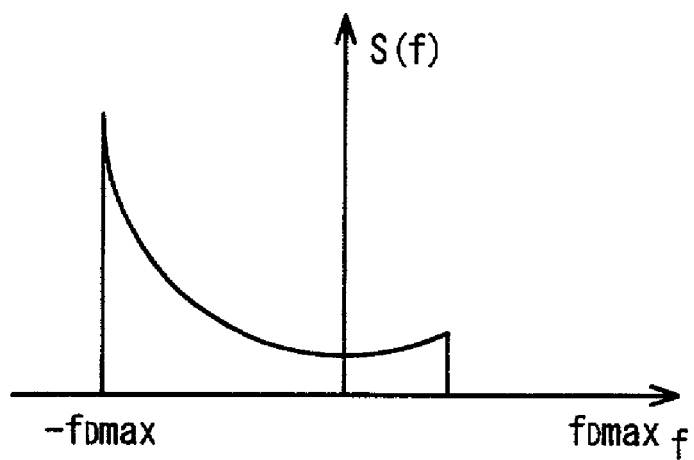
FIG. 10 shows a Doppler spectrum in a case where the gain of a 180°-directional antenna is not ideal.

The Doppler shift of each element wave is decided by the angle of arrival with respect to the direction of vehicular movement. This means that the component along the X axis (the horizontal direction in FIG. 9) only will pose a problem. Accordingly, in a case where directivity is in the direction of moving, the Doppler-shift component in exactly the opposite direction takes on the maximum value and the performance degradations severely. In such case the Doppler shift on each path is not in a constant sign and spreads in the opposite direction in the manner shown in FIG. 10, approaching the state of an omnidirectional antenna. Accordingly, in order to so arrange it that the average value of fading variation can be followed up even if there is some degree of variation in the opposite direction, reliability is provided by multiplying the estimated average value of variation by a weighting coefficient.

Figure 11:
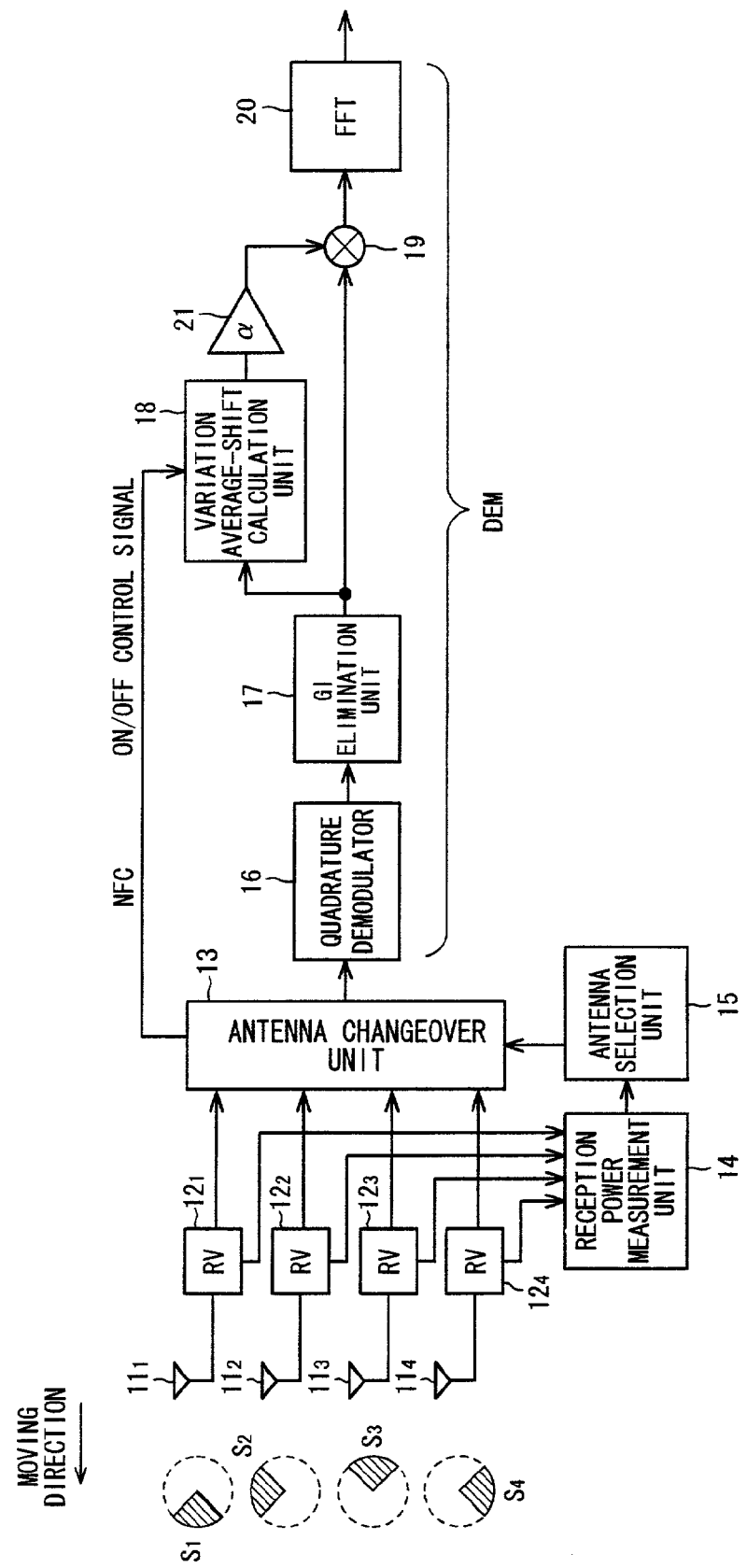
FIG. 11 is a block diagram of an OFDM receiving apparatus according to a second embodiment of the present invention.

FIG. 11 is a block diagram of an OFDM receiving apparatus according to a second embodiment of the present invention. This differs from the first embodiment in that there is provided a multiplier 21 for multiplying the amount of phase shift $\Delta\theta$ calculated by calculation unit 18 by a weighting coefficient $\alpha$ $(0 \leq \alpha \leq 1)$, and in that the fading compensation unit 19 multiplies the receive signal by $\exp(-j\alpha\Delta\theta)$ to compensate for multipath fading and inputs the resulting signal to the FFT calculation unit 20. By virtue of this arrangement, it is possible to multiply the actually calculated amount of variation by an offset in the opposite direction. This makes it possible to alleviate the adverse effects of variation in the opposite direction.

Figure 12:
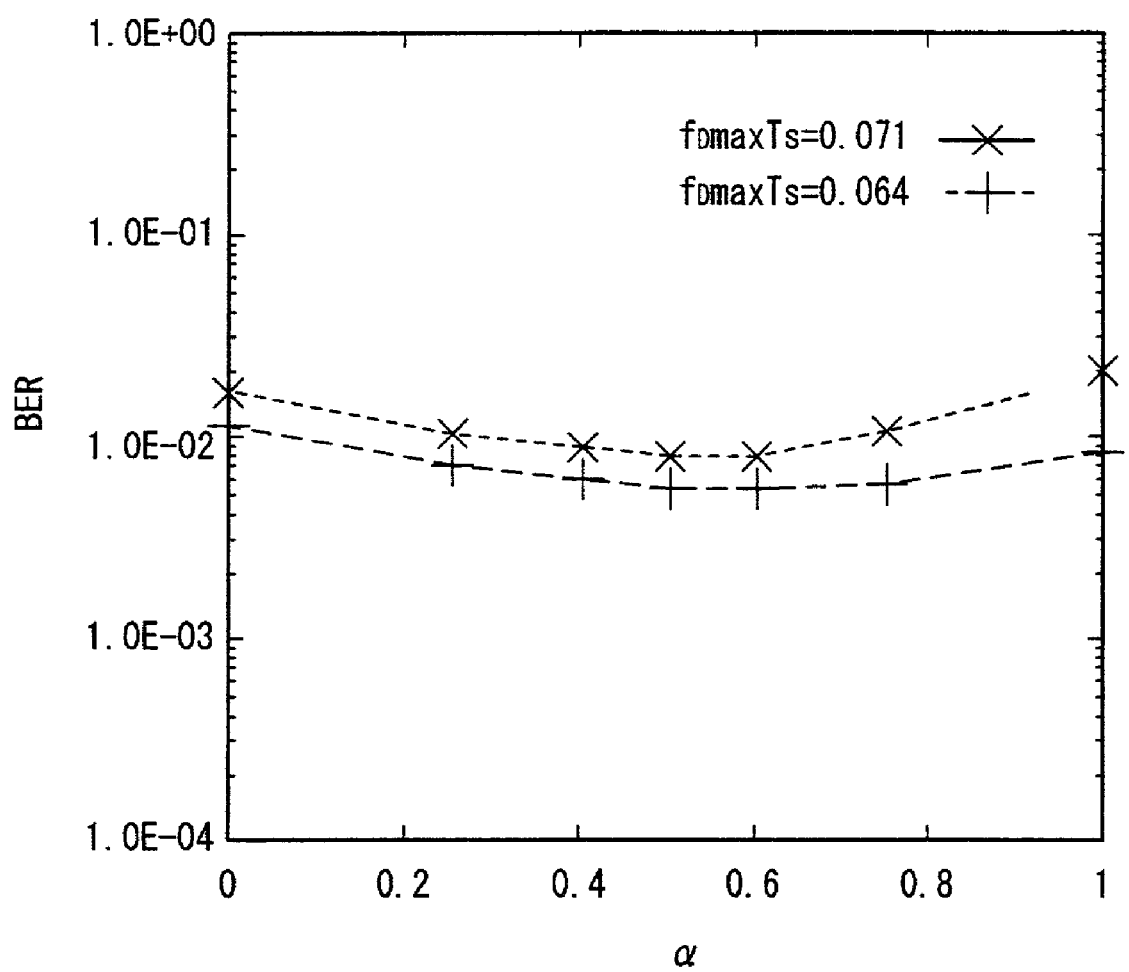
FIG. 12 illustrates a weighting coefficient vs. BER performance.

FIG. 12 illustrates a weighting coefficient vs. BER performance in a case where use is made of a 180° directional antenna for which F/B=6 dB holds. This illustrates an instance where a performance evaluation was performed with regard to $f_{Dmax}Ts=0.071$ and $f_{Dmax}Ts=0.064$. Here $\alpha=0.0$ is for a case where average amount of shift in variation is zero and no compensation for fading is applied, and $\alpha=1.0$ is the case of the first embodiment. The BER performance is not that sensitive with respect to the weighting coefficient. If a permanent value, e.g., $\alpha=0.6$ is used, an improvement in performances becomes possible in all environments. The present performance was obtained by a two-branch antenna diversity.

(E) Third Embodiment

In a case where a plurality of fixed beam patterns are used (e.g., in the case of a switched beam or sector antenna), it is necessary to select a directional antenna whose directivity is in the direction of moving in order to suppress ICI. Since an object of the present invention is to suppress ICI, a directional antenna is selected according to a criterion different from that used in improving power efficiency (i.e., in increasing the S/N ratio by raising antenna gain in the direction along which radio waves arrive), which is the inherently merit of a directional antenna. In other words, with the conventional scheme, a directional antenna having directivity in the direction along which radio waves are arrive, e.g., an antenna for which reception power is highest among a plurality of directional antennas, is selected. In the present invention, however, a directional antenna must be selected in such a manner that ICI can be suppressed. For this reason, there is a tradeoff between the error floor due to ICI and the S/N performance based upon noise.

Figure 13:
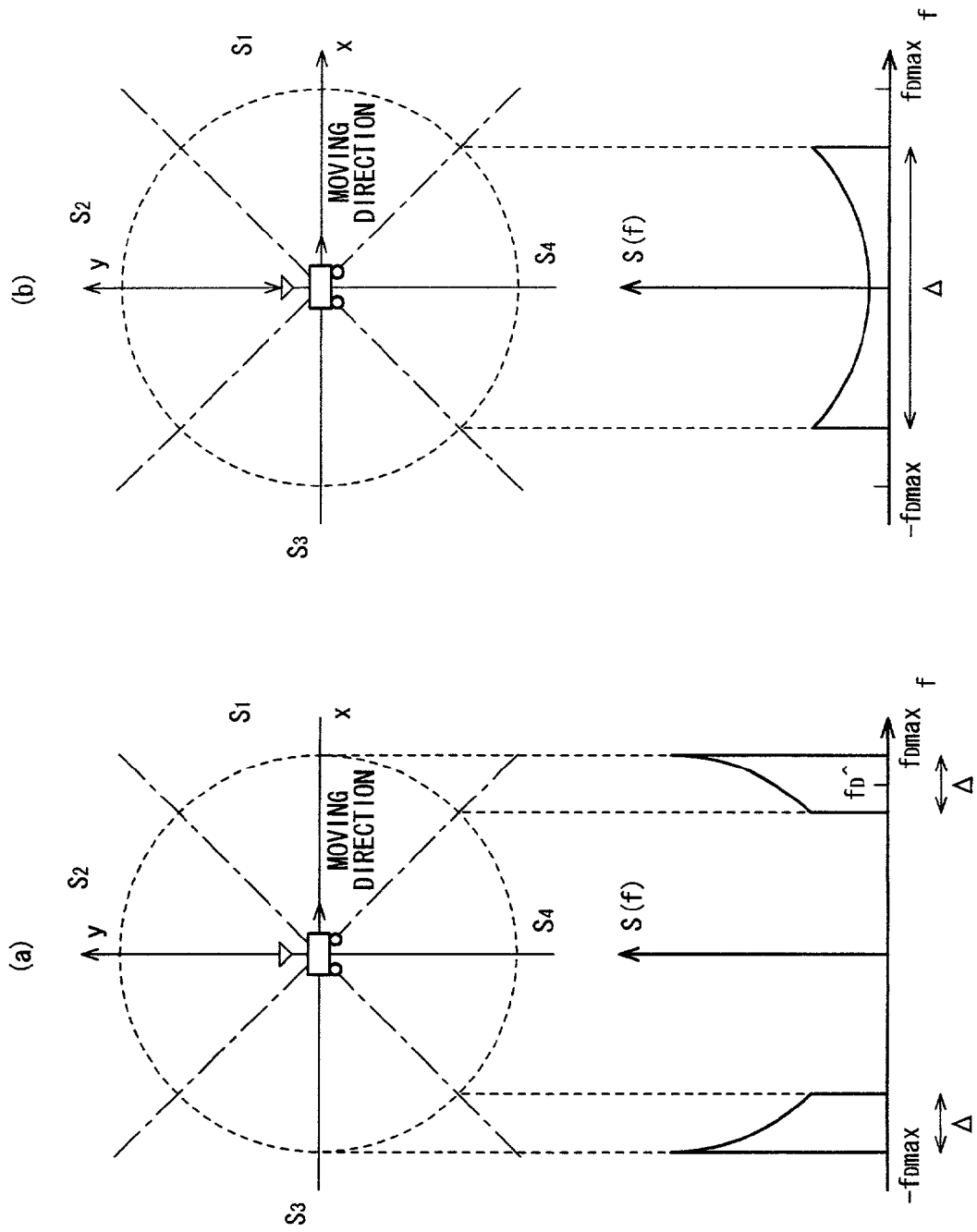
FIG. 13 is a diagram useful in describing Doppler spread Δ of a directional antenna.

If reception power greater than an S/N ratio (or C/N ratio) that satisfies a required BER is obtained, it is not necessarily required to select a directional antenna for which maximum reception power is obtained. The present invention follows up the average variation value of multipath fading, as described above. The smaller the Doppler spread Δ, therefore, the more this effect manifests itself. Accordingly, in the third embodiment, an antenna for which the Doppler spread Δ is minimized is selected in a case where there are a plurality of antennas for which the reception power exceeds the reception power that satisfies the required BER mentioned above. The Doppler spread of antennas having directivity in the direction of moving and in the exactly opposite direction are narrow, as shown in (a) of FIG. 13, while the Doppler spread Δ of antennas directed to the right and left of the direction of moving are wide, as shown in (b) of FIG. 13. Accordingly, if there are a plurality of antennas whose reception power exceeds the reception power that satisfies the required BER is exceeded, the antennas directed forward and rearward are selected preferentially.

Measurement of reception power is performed by measuring RSSI antenna by antenna, by way of example. Further, since antenna installation on a vehicle such as an automobile or train is fixed, the direction of directivity of the selected antenna with respect to the direction of moving is uniquely decided. That is, in the case of a vehicle such as an automobile or train, it is known beforehand whether an antenna is one having directivity in the direction of moving, one having directivity in a direction exactly opposite the direction of moving, or one having directivity in a direction to the left or right of the direction of moving. Accordingly, it is possible to determine the antennas for which spread is small, i.e., the antennas whose directivities are in the direction of moving and in the direction exactly opposite this direction, without detecting the direction of movement of the mobile body.

Figure 14:
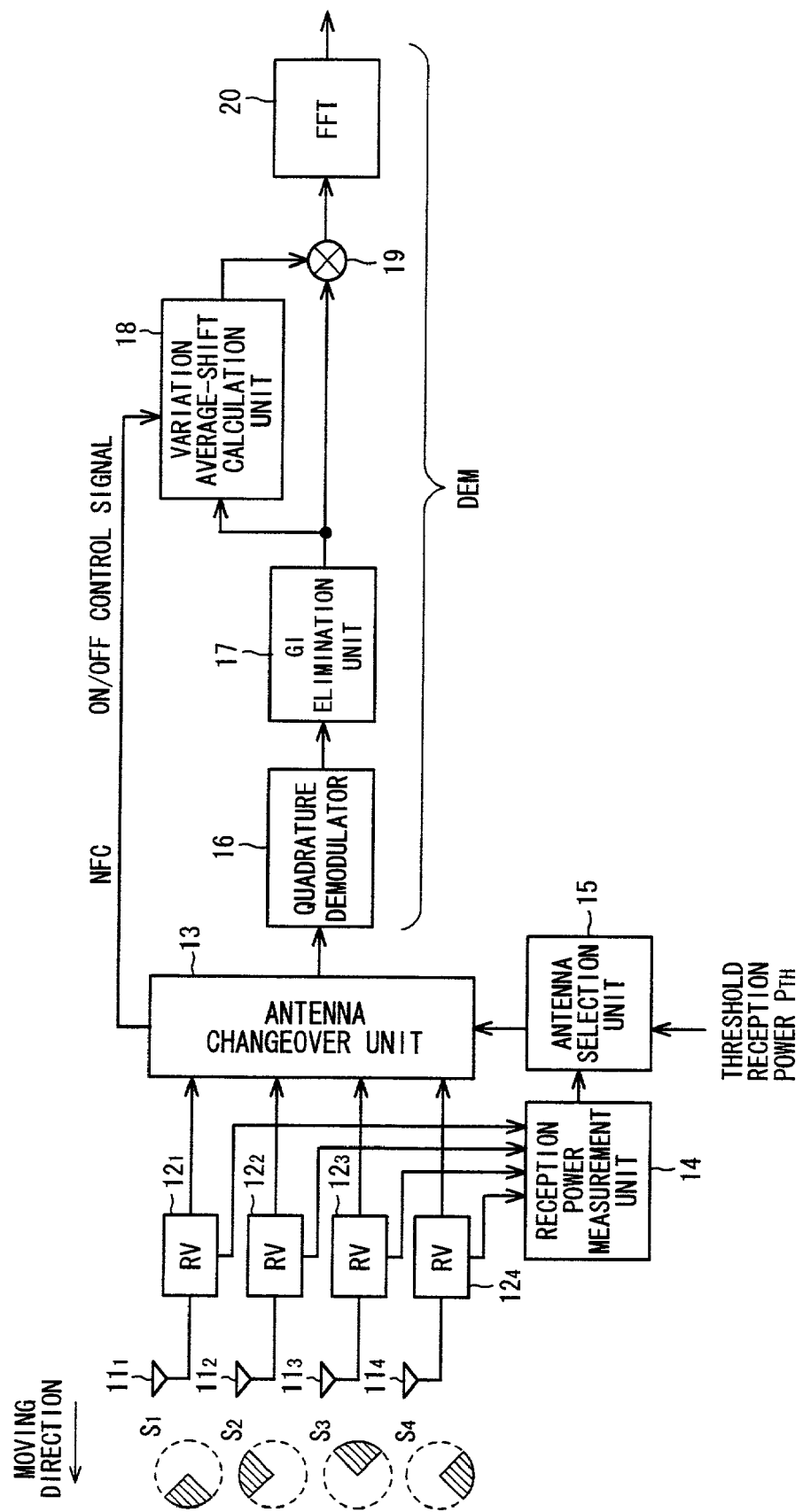
FIG. 14 is a block diagram of an OFDM receiving apparatus according to a third embodiment of the present invention.

FIG. 14 is a block diagram of a third embodiment of the present invention, in which components identical with those of the first embodiment are designated by like reference characters. This embodiment differs in that a threshold reception power $P_{TH}$ is input to the antenna selection unit 15, and in the method of selecting the receive antenna performed by the antenna selection unit 15.

The third embodiment is for a case where the directional antennas $11_1$ to $11_4$ are pointing in respective ones of the four directions (S1, S2, S3 and S4). When reception power that exceeds the threshold reception power has been observed at least at one of the antennas each in both the leftward-rightward group (S2, S4) and forward-rearward group (S1, S3), the antenna $11_1$ or $11_3$ in the latter group (S1, S3) is always selected.

More specifically, the reception power measurement unit 14 measures the reception power of each of the antennas $11_1$ to $11_4$, and the antenna selection unit 15 compares the reception power of each antenna and the preset threshold reception power $P_{TH}$ and adopts as a candidate antenna the antenna whose reception power is greater than the threshold reception power $P_{TH}$. Furthermore, if there are a plurality of candidate antennas and the reception power of an antenna in each of the two groups, namely the leftward-rightward group (S2, S4) and forward-rearward group (S1, S3), is greater than $P_{TH}$, then the antenna selection unit 15 always adopts the antenna $11_1$ or $11_3$ in the forward-rearward group as the finally selected antenna. Of course, if only one group has the candidate antenna, e.g., if the two antennas $11_1$, $11_3$ in the moving direction S1 and direction S3 exactly opposite the moving direction have been selected, the antenna whose reception power is the larger is made the finally selected antenna.

If the above arrangement is adopted, a directional antenna having a large reception power and a narrow Doppler spread is selected so that ICI can be suppressed while a large reception power is maintained.

The foregoing is for a case where directional antennas are mounted on a mobile body such as an automotive vehicle. However, even if the above assumption does not hold, as in the case of a cellular telephone, no particular separate means need be provided so long as directivity is narrowed down. If it is necessary to detect the direction of moving, this can be dealt with using a sixth embodiment, described later.

(F) Fourth Embodiment

As pointed out above, ICI is proportional to moving velocity (v). That is, if moving velocity is high, the Doppler frequency $f_{Dmax}$ increases, the Doppler spectrum spreads and ICI increases, as shown in (a) of FIG. 15. However, if moving velocity is low, the Doppler frequency $f_{Dmax}$ decreases, the Doppler spectrum narrows and ICI decreases, as shown in (b) of FIG. 15. Further, since the present invention does not use a directional antenna in the conventional manner of use, it cannot be said that the first to third embodiments are always the optimum arrangements in a range wherein ICI has no influence upon reception performances, namely when the mobile body is moving at low velocity. The reason for this is that since a directional antenna is used, reception power that is capable of being received by an omnidirectional antenna is partially lost in an environment where radio waves arrive uniformly.

Figure 16:
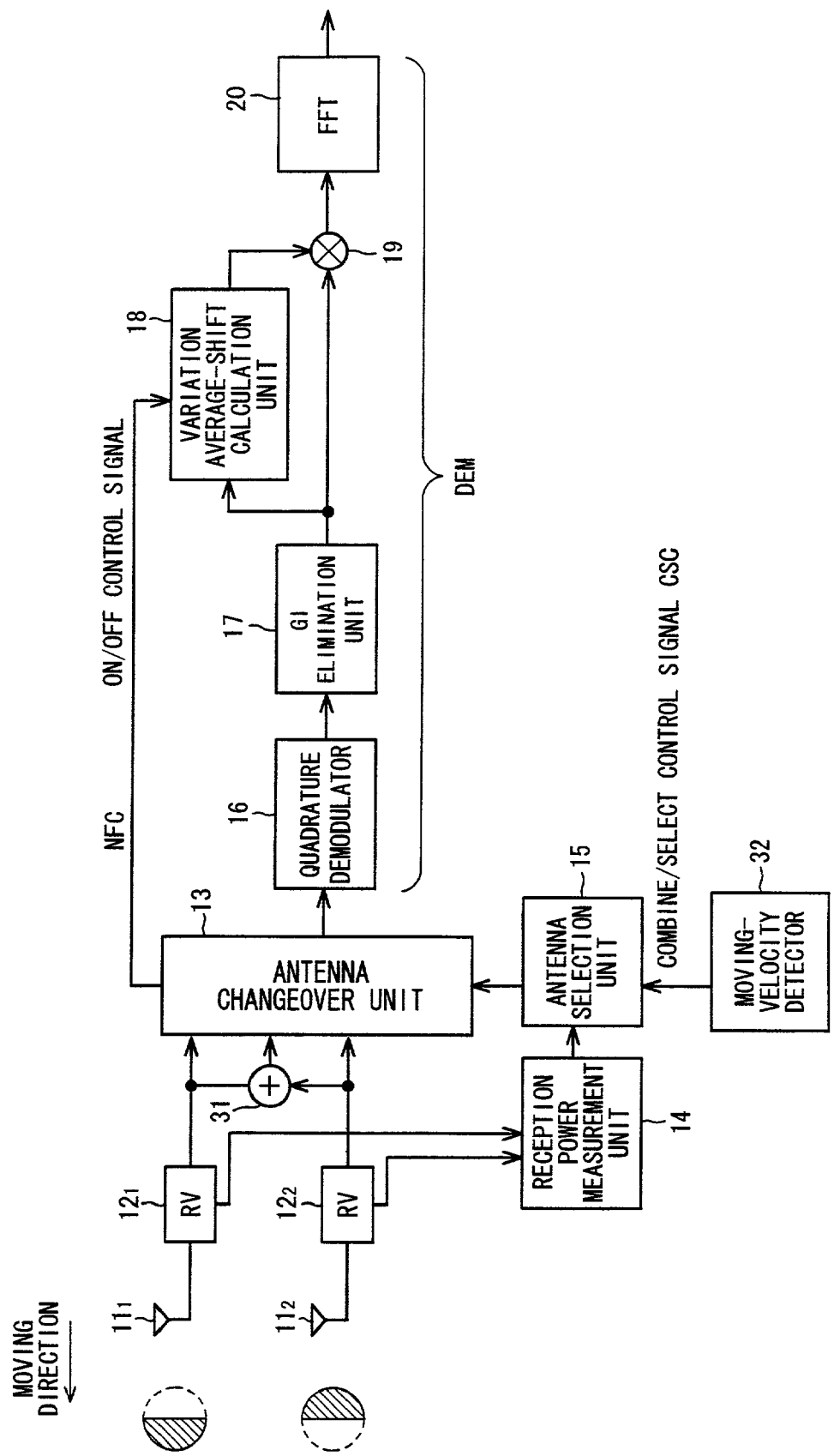
FIG. 16 is a block diagram of an OFDM receiving apparatus according to a fourth embodiment of the present invention.

FIG. 16 is a block diagram of an OFDM receiving apparatus according to a fourth embodiment of the present invention. This is an example in which two 180° directional antennas are used. Components identical with those of the first embodiment are designated by like reference characters. This embodiment differs in that ① there are two directional antennas and two radio receivers, ② a combiner 31 for combining the outputs of the radio receivers is provided, ③ a moving-velocity detector 32 is provided, ④ the antenna selection unit 15 selects a receive antenna or combined antennas taking the magnitude of moving velocity into account, and ⑤ the antenna changeover unit 13 selects and outputs a receive signal or combined signal from the antenna or antennas selected by the antenna selection unit 15. It should be noted that although this illustrates an example in which two 180° directional antennas are used, there is no limitation upon the number of antennas. For example, four 90° directional antennas may be used.

The antenna selection unit 15 combines receive signals from the sector antennas $11_1$, $11_2$ if the error floor due to ICI is less than the required BER, and uses a receive signal only from the sector antenna having the larger reception power if the error floor is equal to or greater than the required BER. As a result, an optimum solution is provided for all states. In actuality, ICI or the reception performance is calculated beforehand from the maximum fading frequency obtained from the moving velocity, a moving velocity serving as a threshold is decided, the receive signals of sector antennas $11_1$, $11_2$ are combined and fading compensation is halted when the moving velocity is less than the threshold, and control of fading compensation is executed using the receive signal of the sector antenna having the larger reception power when the moving velocity is equal to or greater than the threshold. That is, the moving-velocity detector 32 measures the moving velocity and outputs a combine/select control signal CSC that acts as a combine signal or select signal depending upon whether the moving velocity is greater than or less than the threshold velocity.

If the moving velocity is low and the combination of antennas has been specified, the antenna selection unit 15 selects the combined antennas (the output of a combiner 31). If the moving velocity is high and selection of an antenna has been specified, the antenna selection unit 15 selects the antenna having the larger reception power and reports the selection to the antenna changeover unit 13. As a result of the above operation, the antenna changeover unit 13 selects and outputs a combined signal from the antennas or the receive signal of the antenna of which it has been notified. It should be noted that in the case where the combined signal is selected, the antenna changeover unit 13 instructs the calculation unit 18 or fading compensation unit 19 to halt fading compensation. In the case where the receive signal of an antenna is output, the antenna changeover unit 13 instructs that fading compensation should be started.

In the foregoing, the fourth embodiment is constructed by modifying the first embodiment. However, the fourth embodiment can be constructed by modifying the third embodiment. In the latter case, selection of the receive antenna at the time of high travelling velocity would be performed in accordance with the criteria of the third embodiment.

(G) Fifth Embodiment

Figure 17:
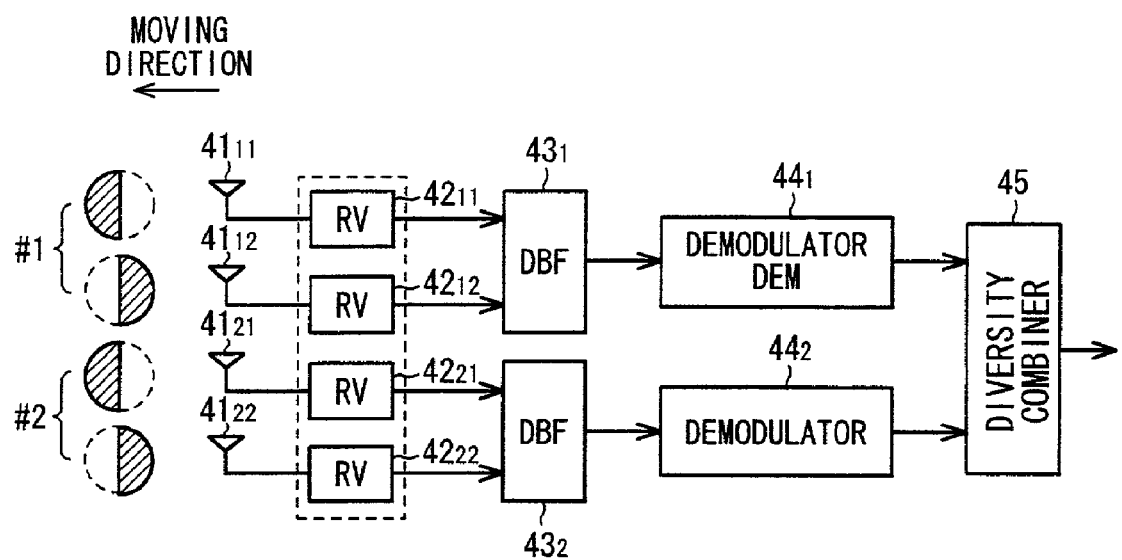
FIG. 17 shows an example of a diversity arrangement.

In the first to fourth embodiments, directional antennas are used by being switched among. However, performance degradation is anticipated when antennas are switched. Specifically, in an arrangement that uses demodulators (the demodulator 16 and its associated circuits 17 to 20 in each of the above embodiments) the number of which is less than the number of antennas, it is necessary that the antennas be switched. In such case, a discontinuity occurs in estimating the channel at the demodulator and it is anticipated that this will cause performance degradation. For example, in the case of two-branch diversity reception, an arrangement is adopted in which 180° directional antennas $41_{11}$, $41_{12}$, $41_{21}$, $41_{22}$ are placed on the mobile body facing forward and rearward, as shown in FIG. 17. In this arrangement, directivity of 180° is formed by the sets of two antennas $41_{11}$, $41_{12}$ and $41_{21}$, $41_{22}$ using digital beam formers (DPF) $43_1$, $43_2$. More specifically, directivities in the forward and rearward directions are obtained by weighting the outputs of two antennas. In FIG. 17, #1 and #2 denote branch numbers. This arrangement further includes demodulators (DEM) $44_1$, $44_2$ according to the first to fourth embodiments, and a diversity combiner 45 for combining the outputs of the demodulators of branches #1 and #2. Since four paths are necessary up to the antenna DBPs in this arrangement, four radio receivers (tuners) $42_{11}$, $42_{12}$, $42_{21}$, $42_{22}$ are required. Since the antennas directed forward and rearward in each of branches #1, #2 are switched between to perform reception, the reception performance is degraded at the switching interval and the average reception performance is affected as well.

Figure 18:
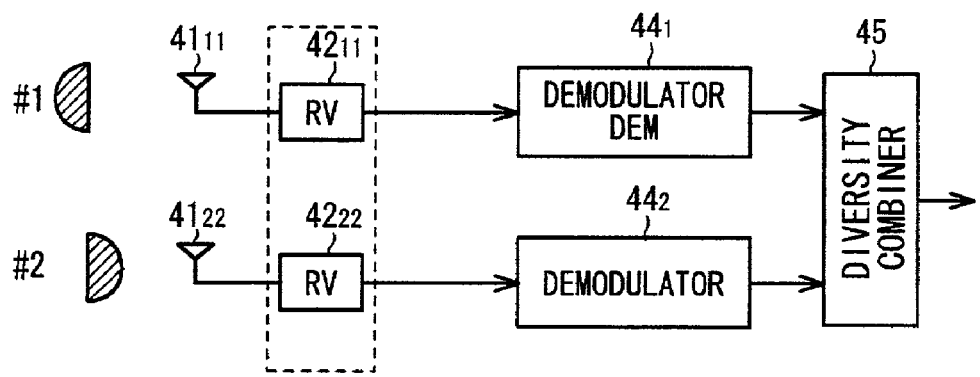
FIG. 18 is a block diagram of an OFDM receiving apparatus having a diversity arrangement in a fifth embodiment of the present invention.

Accordingly, if directivity is produced at the antennas, processing handled with half the number of branches. This will make it possible to reduce the scale of the apparatus by half or more. FIG. 18 is a block diagram of an OFDM receiver according to the fifth embodiment, in which directivity is produced at the antennas. Components identical with those shown in FIG. 17 are designated by like reference characters. In the fifth embodiment, a single 180° directional antenna $41_{11}$ having directivity in the forward direction is provided as the forward antenna, a single 180° directional antenna $41_{22}$ having directivity in the rearward direction is provided as the rearward antenna, and these antennas are adopted as diversity antennas of mutually independent branches #1, #2.

In accordance with the fifth embodiment, a mobile body is provided with the plurality of directional antennas $41_{11}$, $41_{22}$ having different directivities, these are adopted as antennas of independent branches #1, #2, respectively, and the calculation unit 18 of each of the demodulators $44_1$, $44_2$ uses the antenna receive signal of the respective branch to calculate the average value of fading variation in the multipath environment prior to FFT processing. Further, the fading compensation unit 19 of each of the demodulators $44_1$, $44_2$ corrects fading variation based upon the respective average value, and the FFT calculation unit 20 subjects the fading-compensated signal to an FFT operation and outputs the results of processing to the diversity combiner 45. As a result, the diversity combiner 45 diversity-combines the results of FFT processing of each of the branches and outputs the resultant signal.

Thus, in accordance with the fifth embodiment, the number of antennas and the number of demodulators can be made the same. As a result, antenna switching can be eliminated. Moreover, the number of radio receivers can be reduced and, moreover, the DBF unit becomes unnecessary.

Figure 19:
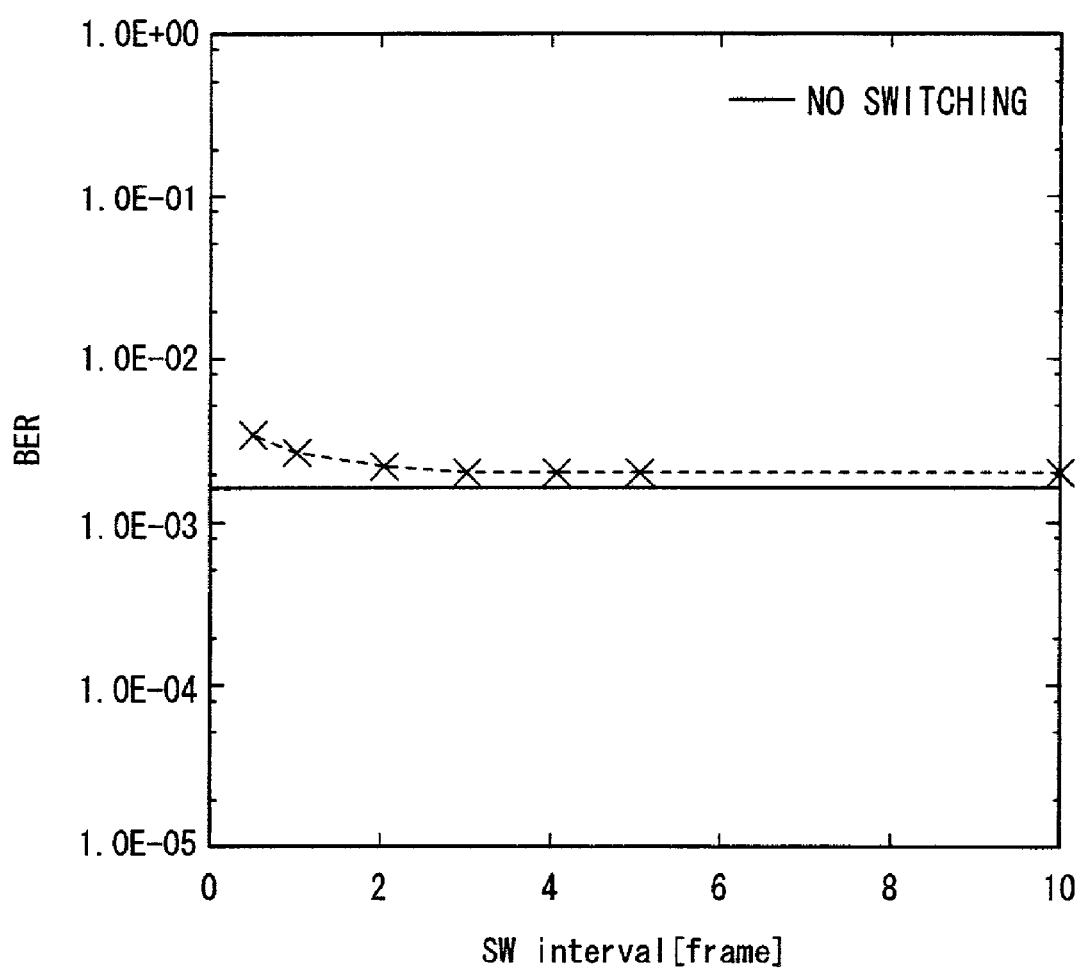
FIG. 19 is a diagram useful in describing a degradation of performances due to antenna switching.

FIG. 19 is a BER performance in an arrangement in which the switching of FIG. 17 is performed and in an arrangement devoid of switching shown in FIG. 18. This illustrates a case where the switching interval (frame unit) is varied. It can be understood from both performances that the performance degradation due to switching is performed. This illustrates a case where one frame is equal to 204 symbols, use is made of ideal antennas having 180° directivity, and a two-branch diversity arrangement is employed. Degradation is severe when switching interval is less than one frame. Hence the effects of the present invention are great. The performance becomes particularly poor if error correction (not illustrated) is applied.

The fifth embodiment shown in FIG. 18 is for a case where two 180° directional antennas, one in the forward direction and one in the rearward direction, are provided on the mobile body. However, it is possible to adopt a four-branch diversity arrangement in which four 90° directional antennas for forward, rearward, leftward and rightward directions are provided on a mobile body. In general, it is possible to adopt an n-branch diversity arrangement in which n-number of (360°/n) directional antennas are deployed on a mobile body.

(H) Sixth Embodiment

In the first and second embodiments, the signal received by a directional antenna having the maximum reception power is input to a demodulator (DEM). In the third embodiment, if there are a plurality of antennas whose reception power exceeds a reception power that satisfies a required BER, the antenna whose directivity lies in the direction of moving is selected preferentially. In an environment in which radio waves arrive over an azimuth of 360°, however, ICI can be suppressed and high quality communication can be performed, irrespective of reception power, if a signal that has been received by an antenna having directivity in the direction of moving or in the direction opposite to this direction is input to the demodulator. In the case of a mobile body such as an automobile or the like, the antenna need only be mounted on the vehicle in such a manner that its directivity will coincide with the direction in which the vehicle moves. In the case of a cellular telephone, however, it is necessary to detect the direction in which the cellular telephone is moving.

Figure 20:
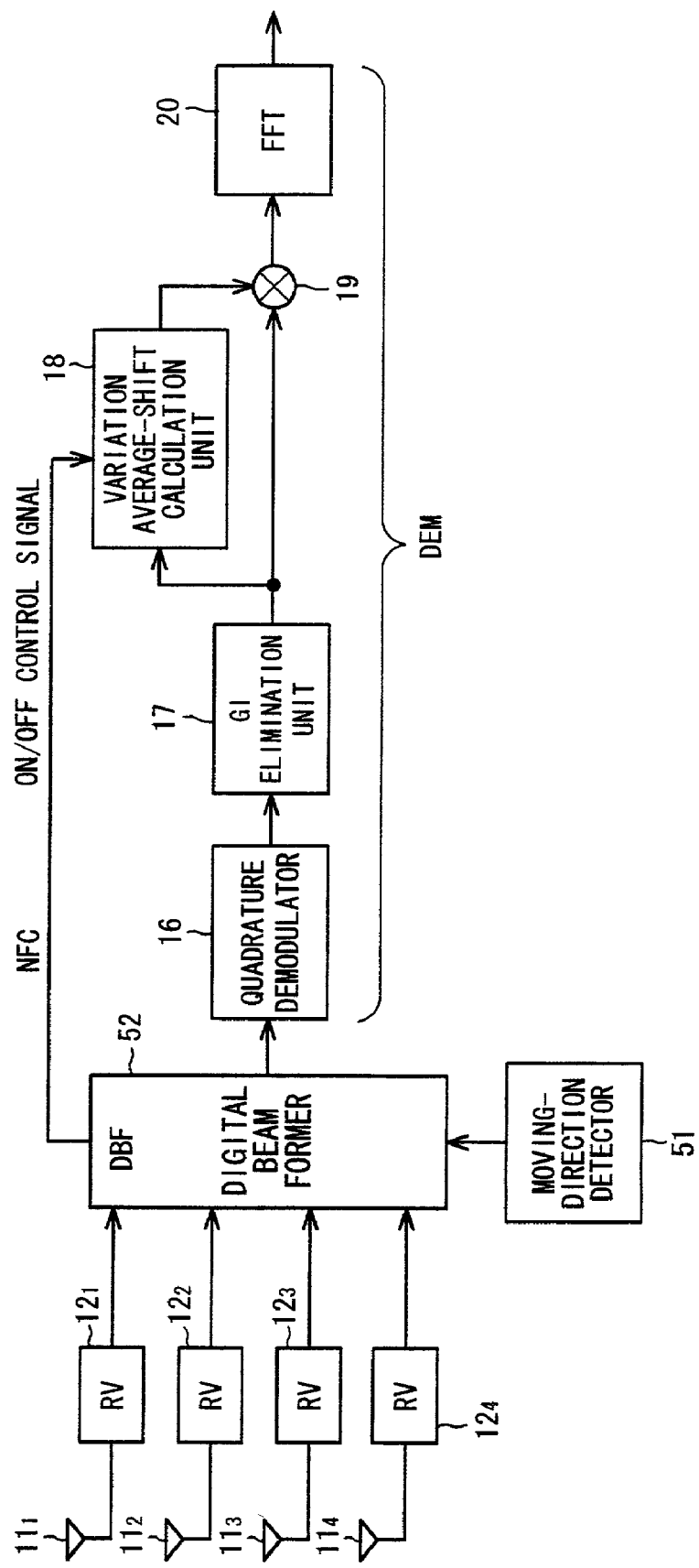
FIG. 20 is a block diagram of an OFDM receiving apparatus according to a sixth embodiment of the present invention.

FIG. 20 is a block diagram of an OFDM receiving apparatus according to a sixth embodiment that can be utilized in a cellular telephone or the like. Components identical with those of the first embodiment are designated by like reference characters. This embodiment differs in that a moving-direction detector 51 is provided, and in that a DBF (Digital Beam Former) 52 is provided for performing beam forming in the direction of moving and inputting the formed signal to the demodulator DEM. The moving-direction detector 51 detects the moving direction and the DBF 52 forms the beam so as to point the direction of directivity in the moving direction, i.e., in such a manner that the beam will have directivity in the moving direction, and inputs the obtained signal to the demodulator DEM. The moving-direction detector 51 switches among the antennas periodically so as to sweep the antenna beam direction over an angle of 360°, calculates the average amount of shift of phase variation and decides that the direction for which the average amount of shift is maximum is the moving direction. Though an antenna changeover unit and a calculation unit for calculating the average amount of shift in variation are required in order to detect the moving direction, the DBF unit 52 and calculation unit 18 can be used for these purposes as well. However, it is provided that these units be provided separately to construct the moving-direction detector 51.

(I) Seventh Embodiment

Figure 21:
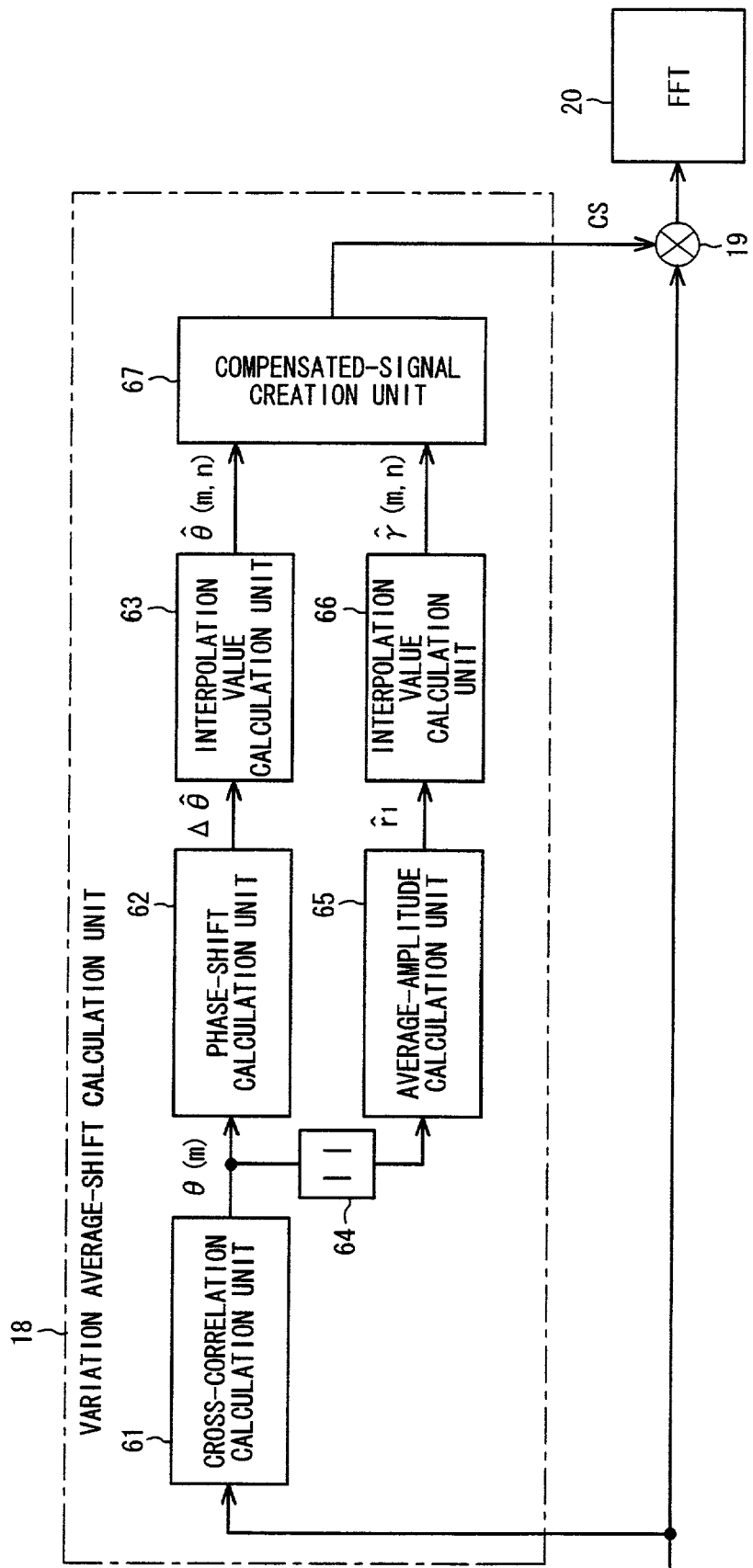
FIG. 21 is a block diagram of a calculation unit for calculating average amount of shift in variation.
Figure 23:
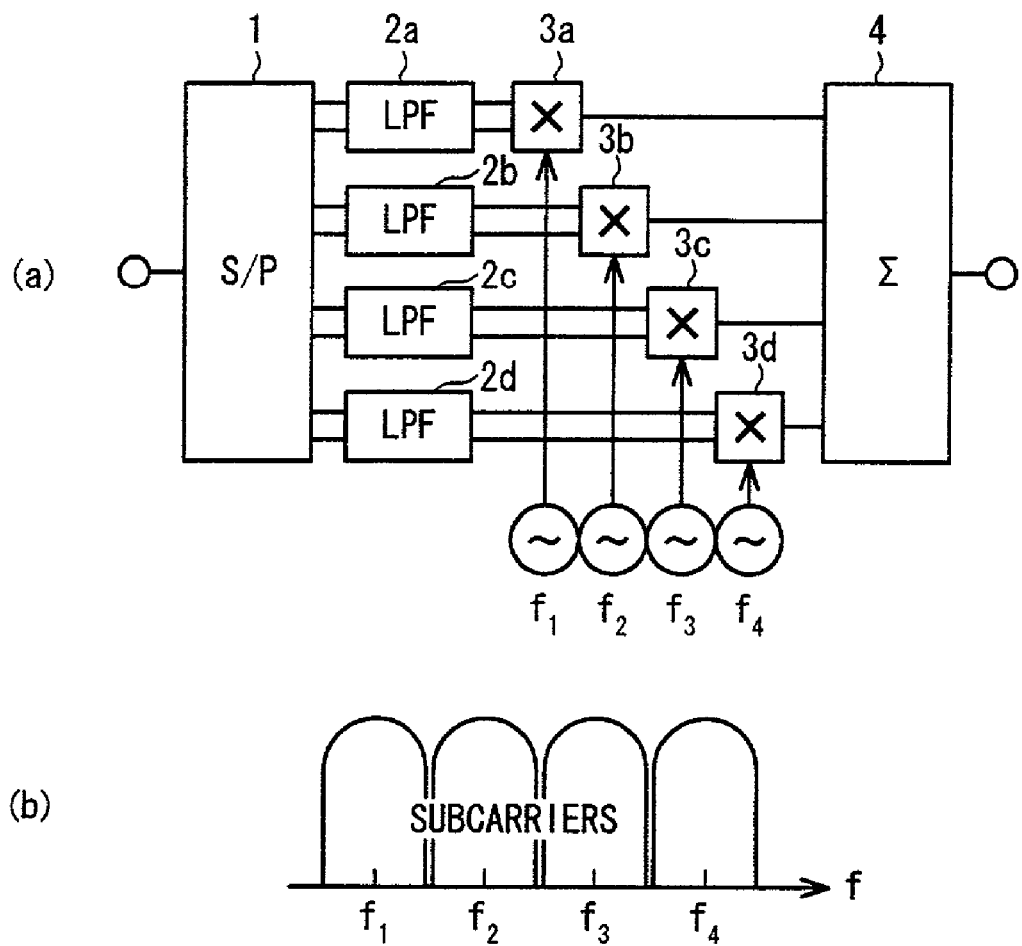
FIG. 23 is a diagram useful in describing a multicarrier transmission scheme.

FIG. 21 illustrates an embodiment of the calculation unit 18 that calculates the average amount of shift in variation according to the first to sixth embodiments. Before the operation of the calculation unit 18 is discussed, a method of compensation average amount of shift error will be described. As a precondition of the compensation method, it is assumed that the transmit frame has a known symbol K in front of a transmit data symbol D, as shown in (a) of FIG. 22. The known symbol K can be a pilot symbol or a copy signal of a guard interval GI. It should be noted that if the known signal is one that has undergone temporal dispersion, the present invention is not limited to this example of a frame. Further, let Ns represent the number of samples (number of symbols) of one OFDM symbol, let Nc represent the number of cross-correlation calculation samples, and let Ts, Tc respectively represent the time intervals of these samples. From here onward, it will be assumed that Nc-number of copy symbols that have been inserted into a guard interval GI constitute a known signal. Further, in a case where not only phase but also amplitude varies due to fading and QAM modulation is performed, a compensation in the amplitude error also becomes necessary. A case where both phase and amplitude are compensated will be described below.

Let S(m,n) represent a complex baseband signal at an nth sample point of an mth OFDM symbol. The amount of variation in fading of sample interval Ts is calculated from cross-correlation:

$$e(m, n) = S*(m, n) \cdot S(m, n + Ns) \quad (0 \le n \le Nc - 1) \tag{1}$$
$$= S*(m, n) \cdot S'(m, n)$$

For the sake of noise suppression, the average is taken over the number Nc of samples (though there is a tradeoff with maximum fading frequency $f_{Dmax}$). An average error vector e(m) of the mth OFDM symbol is $$e(m) = \frac{1}{N_c} \sum_{n=0}^{N_c-1} e(m, n) \tag{2}$$
$$= S*(m) \cdot S'(m)$$

Furthermore, from $S^* = r_1(m)\exp(-j\theta)$, $S'(m) = r_2(m)\exp(-j\theta')$, Equation (2) may be written as follows:

$$e(m) = r_1(m)r_2(m)\exp\{j(\theta' - \theta)\} \tag{3}$$
$$= r_1(m)r_2(m)\exp[j\Delta\theta(m)]$$

Here $r_1(m)$ is the average amplitude value of the initial known signal (first known signal) 101, as shown in (c) of FIG. 22, and is expressed by the following equation:

$$r_1(m) = \sqrt{\frac{1}{N_c} \sum_{n=0}^{N_c-1} S*(m, n) \cdot S(m, n)} \tag{4}$$

where θ is the average amount of phase shift, as shown in (b) in FIG. 22. Further, $r_2(m)$ is the average amplitude value of the next known signal (second known signal) 102 and is expressed by the following equation:

$$r_2(m) = \sqrt{\frac{1}{N_c} \sum_{n=0}^{N_c-1} S*(m, n + N_s) \cdot S(m, n + N_s)} \tag{5}$$

where θ' is the average amount of phase shift. Further, Δθ(m) represents the amount of phase shift in this measurement interval.

This output of cross-correlation value is the average value of variation of all paths in multipath fading. In a case where an omnidirectional antenna is used, therefore, the output becomes zero. Here Δθ(m) is given by the following equation:

$$\Delta\theta(m) = \tan^{-1}\left\{\frac{\text{Im}[e(m)]}{\text{Re}[e(m)]}\right\} \tag{6}$$

An estimated value θ(m,n) of phase shift at the nth sample point is as follows:

$$\hat{\theta}(m, n) = \hat{\theta}(m, 0) + \left(\frac{n}{N_s}\right) \cdot \Delta\theta(m) \tag{7}$$

and the amount of phase shift in the measurement interval is obtained in its entirety.

Further, the amplitude value |e(m)| of the average error vector is given by the following equation:

$$|e(m)| = \sqrt{Rc[c(m)]^2 + \text{Im}[c(m)]^2} \tag{8}$$
$$= r_1(m)r_2(m)$$

Accordingly, it is possible to perform amplitude compensation, without using $r_2(m)$, in accordance with the following equation:

$$\hat{r}(m, n) = \hat{r}_1(m, 0) + \left(\frac{n}{N_s}\right) \cdot \left[\frac{|e(m)|}{r_1 m} - r_1(m)\right] \tag{9}$$

Though Equation (9) is based upon a linear interpolation, the interpolation can be a higher order interpolation or a different interpolation method can be used. Further, we have $$\hat{r}_1(m, 0) = \hat{r}_1(m) - \left(\frac{N_c}{2N_s}\right) \cdot \left[\frac{|e(m)|}{r_1(m)} - r_1(m)\right] \tag{10}$$

Though the foregoing is for a case where both a phase compensation and an amplitude compensation are carried out, it can be so arranged that only phase or only amplitude is compensated.

In the embodiment of FIG. 21, a cross-correlation calculation unit 61 calculates the average error vector e(m) in accordance with Equations (1) to (3), a phase-shift calculation unit 62 calculates Δθ(m) in accordance with Equation (6), and a phase interpolation value calculation unit 63 interpolates the phase-shift estimation value θ(m,n) at the nth sample point in accordance with Equation (7). An absolute-value calculation unit 64 calculates the absolute value of the average error vector e(m), an average-amplitude calculation unit 65 calculates the average amplitude value $r_1(m)$ of the first known signal 101 in accordance with Equations (4) and (10), and an amplitude interpolation value calculation unit 66 interpolates an amplitude variation estimation value r(m,n) at the nth sample point in accordance with Equation (9). The phase-shift estimation value θ(m,n) and the amplitude variation estimation value r(m,n) are input to a compensated-signal creation unit 67, which creates and outputs a compensated signal CS for compensating fading variation (phase and amplitude).

In accordance with the present invention, the multipath environment (number of paths and delay profile) per se is not estimated. As a result, ICI can be suppressed by a simple arrangement and the reception performance can be improved.

Further, in accordance with the present invention, means for adding on a weighting coefficient is provided between means for compensation fading variation and a receive FFT calculation unit. As a result, suitable effects can be obtained even if use is made of antennas not having ideal directivity.

Further, in accordance with the present invention, a directional antenna for which Doppler spread is minimum is selected in a case where a plurality of directional antennas that generate reception power greater than a threshold power exist. As a result, an error floor due to ICI can be reduced while a large reception power is maintained, and it is possible to achieve an improvement in performances.

Further, in accordance with the present invention, means for detecting moving speed is provided. When moving speed is lower than the threshold speed, the receive signals of sector antennas (directional antennas) are combined. When moving speed is greater than the threshold speed, on the other hand, compensation of multipath fading is carried out using a receive signal solely of a sector antenna (directional antenna) selected taking reception power and/or Doppler spread into consideration. As a result, power efficiency can be improved at the time of low-speed moving in an environment in which radio waves arrive uniformly. Further, in a system having antenna switching, antenna switching can be avoided at low-speed moving and, hence, performance degradation due to switching can be eliminated.

Further, the present invention is such that if a mobile body is provided with n-number of (360°/n) directional antennas, e.g., with two 180°-directional antennas, one directed forward and one directed rearward, in an environment in which radio waves arrive from all directions over an azimuth of 360°, a two-branch diversity arrangement is constructed using the forward and rearward antennas as antennas of independent branches. As a result, antenna switching can be eliminated and diversity reception that is free of any degradation in performances can be achieved.

Further, the present invention is such that in order to calculate an average value of fading variation (phase variation and amplitude variation) on each path, a cross-correlation value is calculated using an already known temporally dispersed signal or a copy signal in a guard interval, and the amplitude and phase of an obtained cross-correlation vector are adopted as an average value of fading variation (phase variation and amplitude variation) on the paths. The error due to multipath fading is then compensated using the average value. As a result, fading compensation can be achieved and performances can be improved through a simple arrangement in a multipath fading environment.

As many apparently widely different embodiments of the present invention can be made without departing from the spirit and scope thereof, it is to be understood that the invention is not limited to the specific embodiments thereof except as defined in the appended claims.

What is claimed is:

1. An OFDM receiving method for receiving a signal multiplexed according to Orthogonal Frequency Division Multiplexing (OFDM) and applying Fast Frequency Transform (FFT) processing to the received signal to demodulate transmit data, comprising the steps of:

providing a mobile body with a plurality of directional antennas having directivities that differ from one another and include a directivity in a direction of moving or in a direction opposite the direction of moving;

selecting a directional antenna in such a manner that Doppler shift that is caused by movement of the mobile body will keep a constant sign that is positive or negative;

calculating, prior to FFT processing, an average value of fading-variation in a multipath environment using a received signal from the antenna that has been selected; and compensating the fading-variation based upon the average value, wherein the average value is attenuated and fading-variation in the multipath environment is compensated based upon a value obtained by attenuation.

2. An OFDM receiving method for receiving a signal multiplexed according to Orthogonal Frequency Division Multiplexing (OFDM) and applying Fast Frequency Transform (FFT) processing to the received signal to demodulate transmit data, comprising the steps of:

providing a mobile body with a plurality of directional antennas having directivities that differ from one another and include a directivity in a direction of moving or in a direction opposite the direction of moving;

selecting a directional antenna in such a manner that Doppler shift that is caused by movement of the mobile body will keep a constant sign that is positive or negative;

calculating, prior to FFT processing, an average value of fading-variation in a multipath environment using a received signal from the antenna that has been selected;

compensating the fading-variation based upon the average value;

combining received signals from each of the directional antennas and halting compensation of fading when the mobile body is moving at a velocity lower than a threshold velocity; and selecting a directional antenna, and performing the fading compensation, based upon reception power and/or Doppler spread when the mobile body is moving at a velocity equal to or greater than the threshold velocity.

3. An OFDM receiving apparatus for receiving a signal multiplexed according to Orthogonal Frequency Division Multiplexing (OFDM) and applying Fast Frequency Transform (FFT) processing to the received signal to demodulate transmit data, comprising:

a plurality of directional antennas having directivities that differ from one another and include a directivity in a direction of moving or in a direction opposite the direction of moving, provided on a mobile body;

a directional antenna selecting unit for selecting a directional antenna in such a manner that Doppler shift that is caused by movement of the mobile body will keep a constant sign that is positive or negative;

a fading-variation calculation unit for calculating, prior to FFT processing, an average value of fading-variation in a multipath environment using a received signal from the antenna that has been selected;

a fading-variation compensation unit for compensating the fading-variation based upon the average value;

an FFT unit for applying FFT processing to a signal obtained by the fading compensation; and an attenuator for attenuating the average value by multiplying the average value by a weighting coefficient;

wherein fading-variation in the multipath environment is compensated based upon the average value that has been attenuated.

4. An OFDM receiving apparatus for receiving a signal multiplexed according to Orthogonal Frequency Division Multiplexing (OFDM) and applying Fast Frequency Transform (FFT) processing to the received signal to demodulate transmit data, comprising:

a plurality of directional antennas having directivities that differ from one another and include a directivity in a direction of moving or in a direction opposite the direction of moving, provided on a mobile body;

a directional antenna selecting unit for selecting a directional antenna in such a manner that Doppler shift that is caused by movement of the mobile body will keep a constant sign that is positive or negative;

a fading-variation calculation unit for calculating, prior to FFT processing, an average value of fading-variation in a multipath environment using a received signal from the antenna that has been selected;

a fading-variation compensation unit for compensating the fading-variation based upon the average value;

an FFT unit for applying FFT processing to a signal obtained by the fading compensation; and a reception-power measurement unit for measuring reception signal power of the directional antennas;

wherein said directional antenna selecting unit selects a directional antenna for which Doppler spread is minimum from among directional antennas for which reception power exceeds a threshold value of power, and wherein the directional antenna for which the Doppler spread is minimum is an antenna whose directivity coincides with a direction of moving of the mobile body.

5. An OFDM receiving apparatus for receiving a signal multiplexed according to Orthogonal Frequency Division Multiplexing (OFDM) and applying Fast Frequency Transform (FFT) processing to the received signal to demodulate transmit data, comprising:

a plurality of directional antennas having directivities that differ from one another and include a directivity in a direction of moving or in a direction opposite the direction of moving, provided on a mobile body;

a directional antenna selecting unit for selecting a directional antenna in such a manner that Doppler shift that is caused by movement of the mobile body will keep a constant sign that is positive or negative;

a fading-variation calculation unit for calculating, prior to FFT processing, an average value of fading-variation in a multipath environment using a received signal from the antenna that has been selected;

a fading-variation compensation unit for compensating the fading-variation based upon the average value;

an FFT unit for applying FFT processing to a signal obtained by the fading compensation; and a velocity comparator for comparing velocity of the mobile state and a set velocity;

wherein said directional antenna selecting unit combines received signals from each of the directional antennas when the mobile body is moving at a velocity lower than the threshold velocity, and selects a directional antenna based upon reception power and/or Doppler spread when the mobile body is moving at a velocity equal to or greater than the threshold velocity;

wherein said fading-variation calculation unit halts fading compensation when the mobile body is moving at a velocity lower than the threshold velocity, and performs the fading compensation when the mobile body is moving at a velocity equal to or greater than the threshold velocity.

6. An OFDM receiving method for receiving a signal multiplexed according to Orthogonal Frequency Division Multiplexing (OFDM) and applying Fast Frequency Transform (FFT) processing to the received signal to demodulate transmit data, comprising the steps of:

providing a mobile body with a plurality of directional antennas having directivities that differ form one another and include directivity in a direction of moving or in a direction opposite the direction of moving;

selecting a directional antenna for which reception power is maximum;

in a case where the selected antenna has a directivity in a direction of moving or in a direction opposite the direction of moving, calculating, prior to FFT processing, an average value of fading variation in a multipath environment using a signal received by said selected antenna and compensating the fading variation based upon the average value; and in a case where the selected antenna does not have a directivity in a direction of moving or in a direction opposite the direction of moving, performing the FFT processing without the compensation processing of the fading variation.

7. An OFDM receiving apparatus for receiving a signal multiplexed according to Orthogonal Frequency Division Multiplexing (OFDM) and applying Fast Frequency Transform (FFT) processing to the received signal to demodulate transmit date, comprising:

a plurality of directional antennas having directivities that differ from one another and include directivity in a direction of moving or in a direction opposite the direction of moving;

an antenna selecting unit for selecting a directional antenna for which reception power is maximum;

a fading-variation calculation unit for calculating, prior to FFT processing, an average value of fading variation in a multipath environment using a signal received by said selected directional antenna;

a fading-variation compensation unit for compensating the fading variation based upon the average value;

an FFT unit for applying FFT processing to a signal obtained by the fading compensation; and a control unit for deciding whether the fading compensation needs to be performed or not based upon the fact that said selected antenna has a directivity in a direction of moving or in a direction opposite the direction of moving, wherein in a case where said selected antenna has a directivity in a direction of moving or in a direction opposite the direction of moving, the control unit controls the fading-variation calculation unit and fading-variation compensation unit to perform the fading compensation and in a case where said selected antenna does not have a directivity in a direction of moving or in a direction opposite the direction of moving, the control unit controls the fading-variation calculation unit and fading-variation compensation unit not to perform the fading compensation.

* * * * *